Aug. 20, 1974 G. BARNES 3,830,902
METHOD AND APPARATUS FOR MAKING SELF-LOCKING
INTERNALLY THREADED FASTENERS
Original Filed May 31, 1966 16 Sheets-Sheet 9

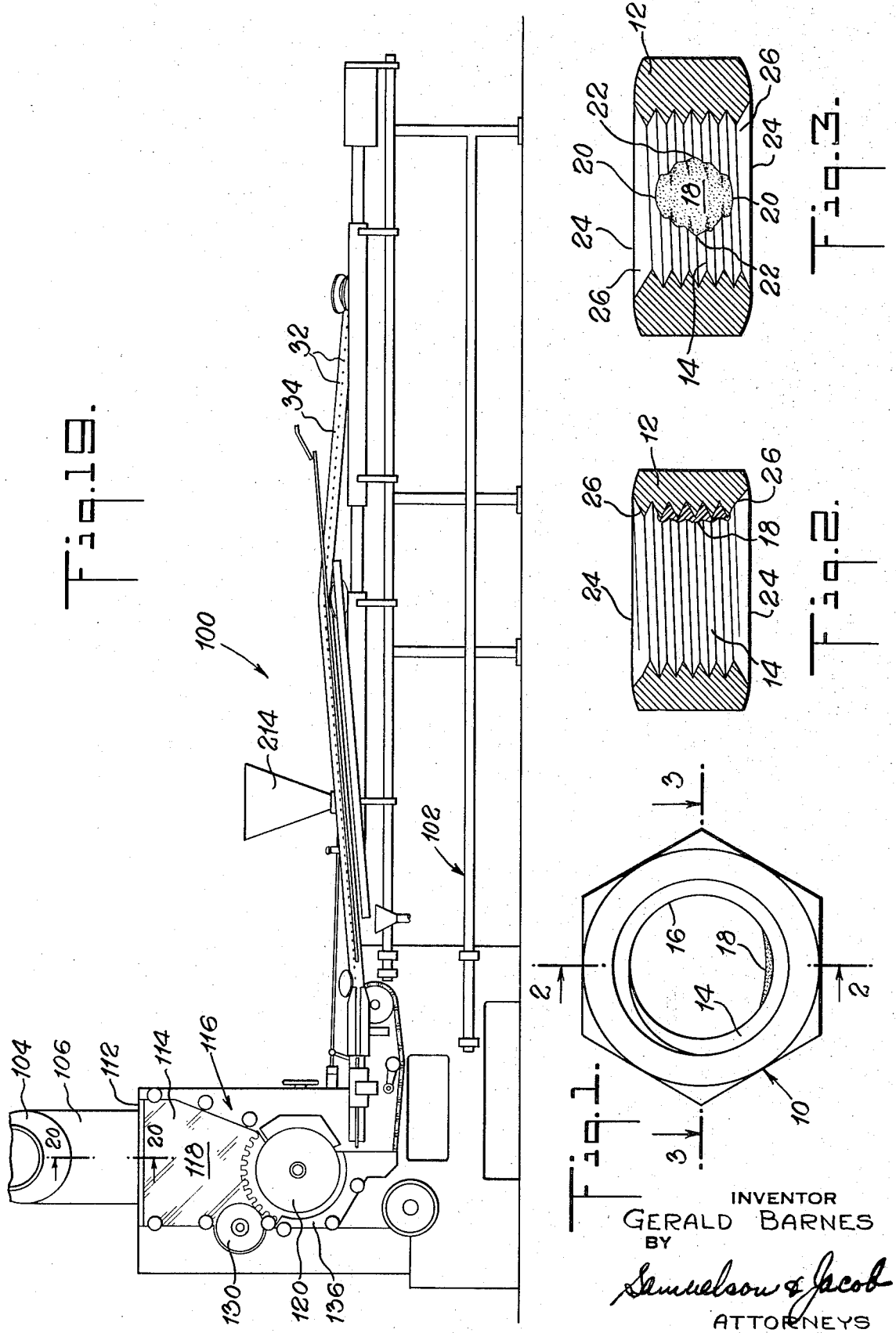

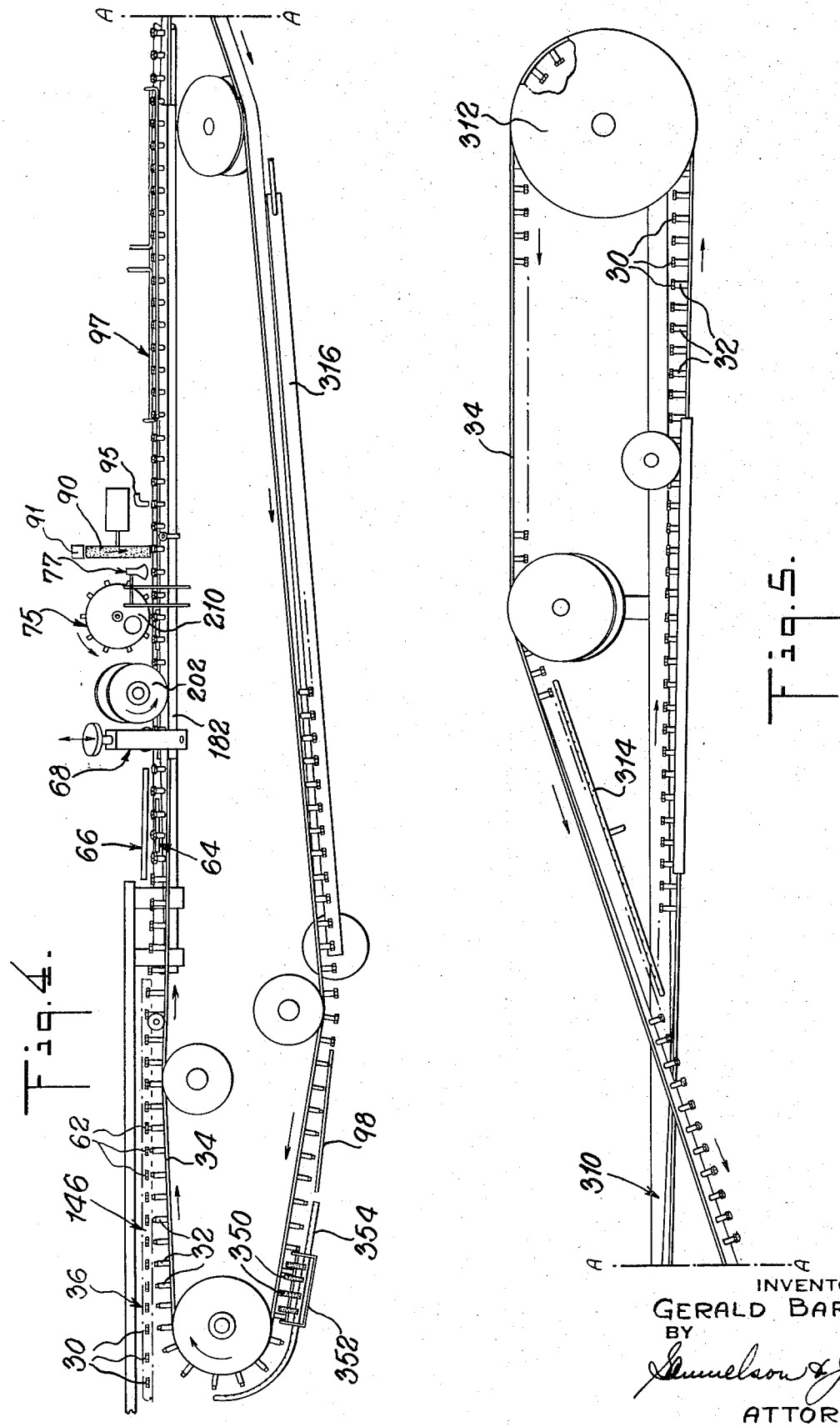

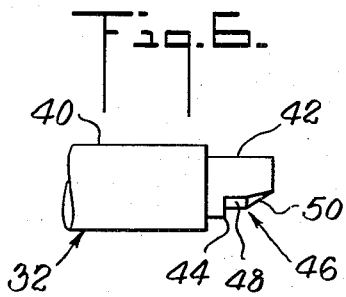
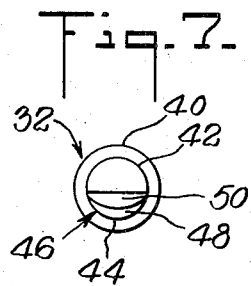
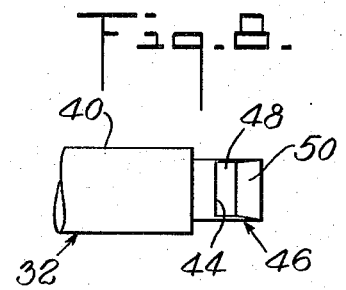
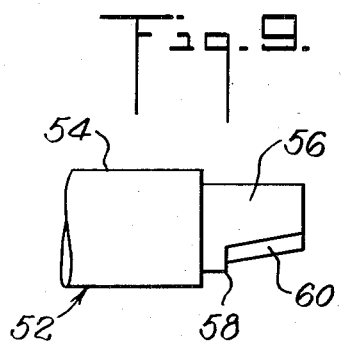
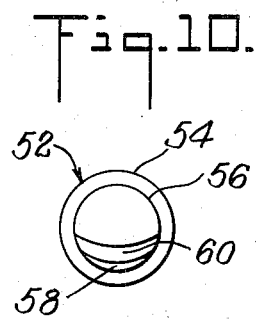
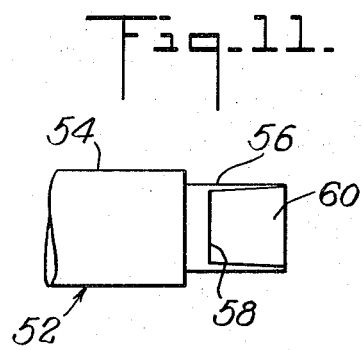
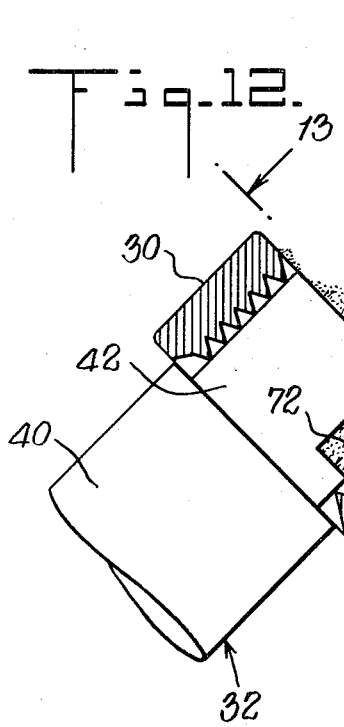
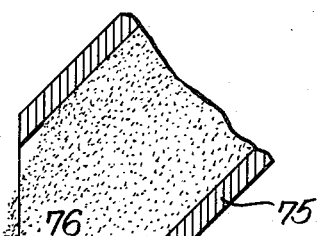
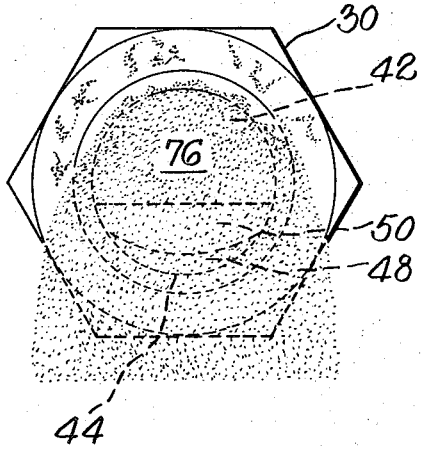

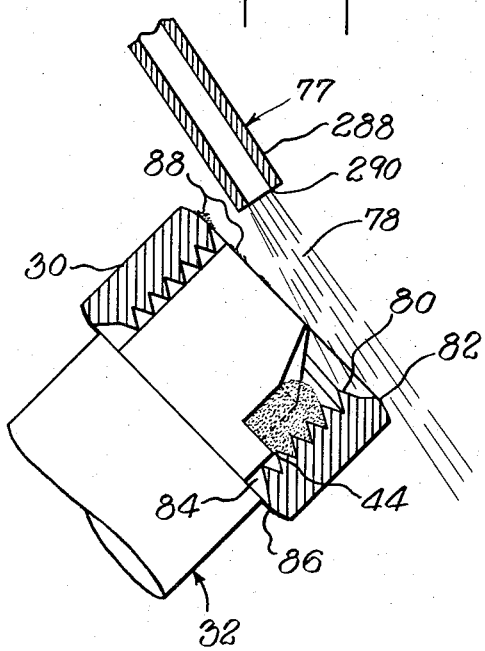
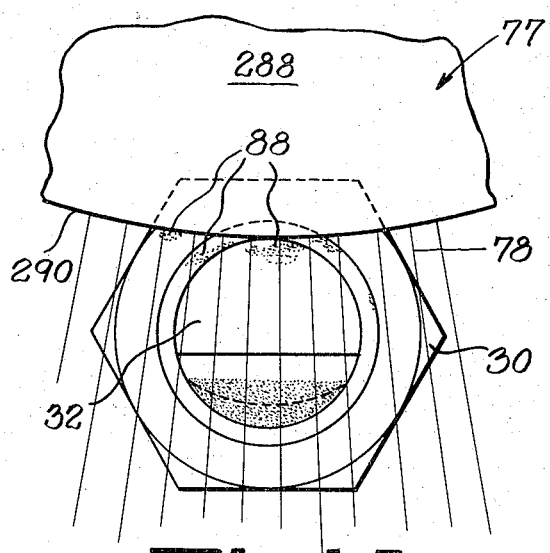
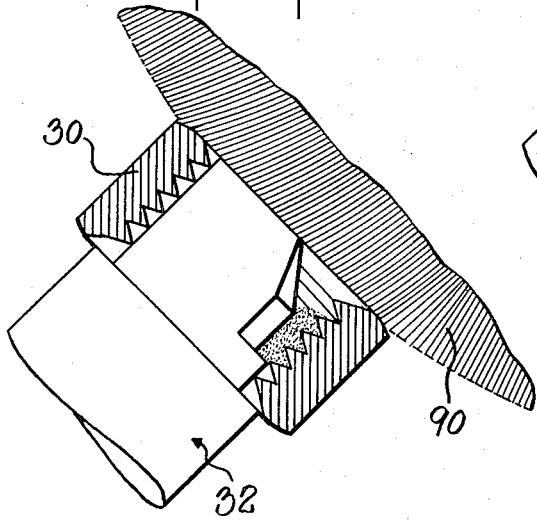
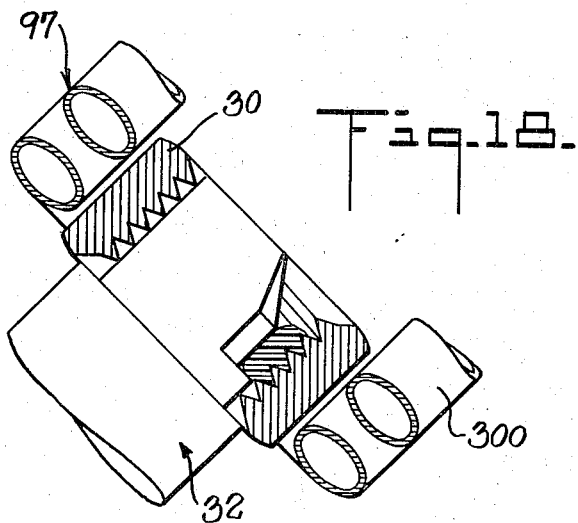

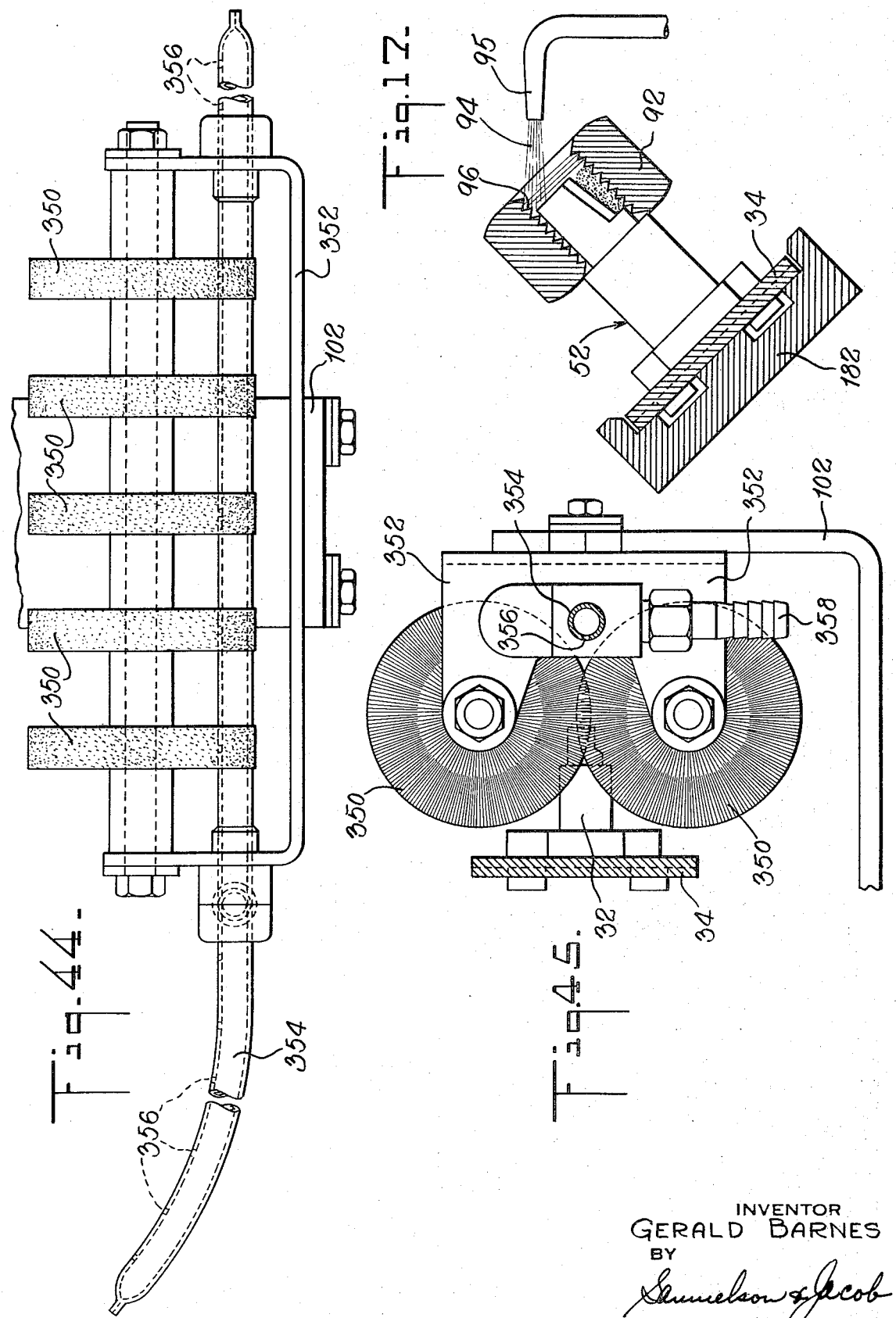

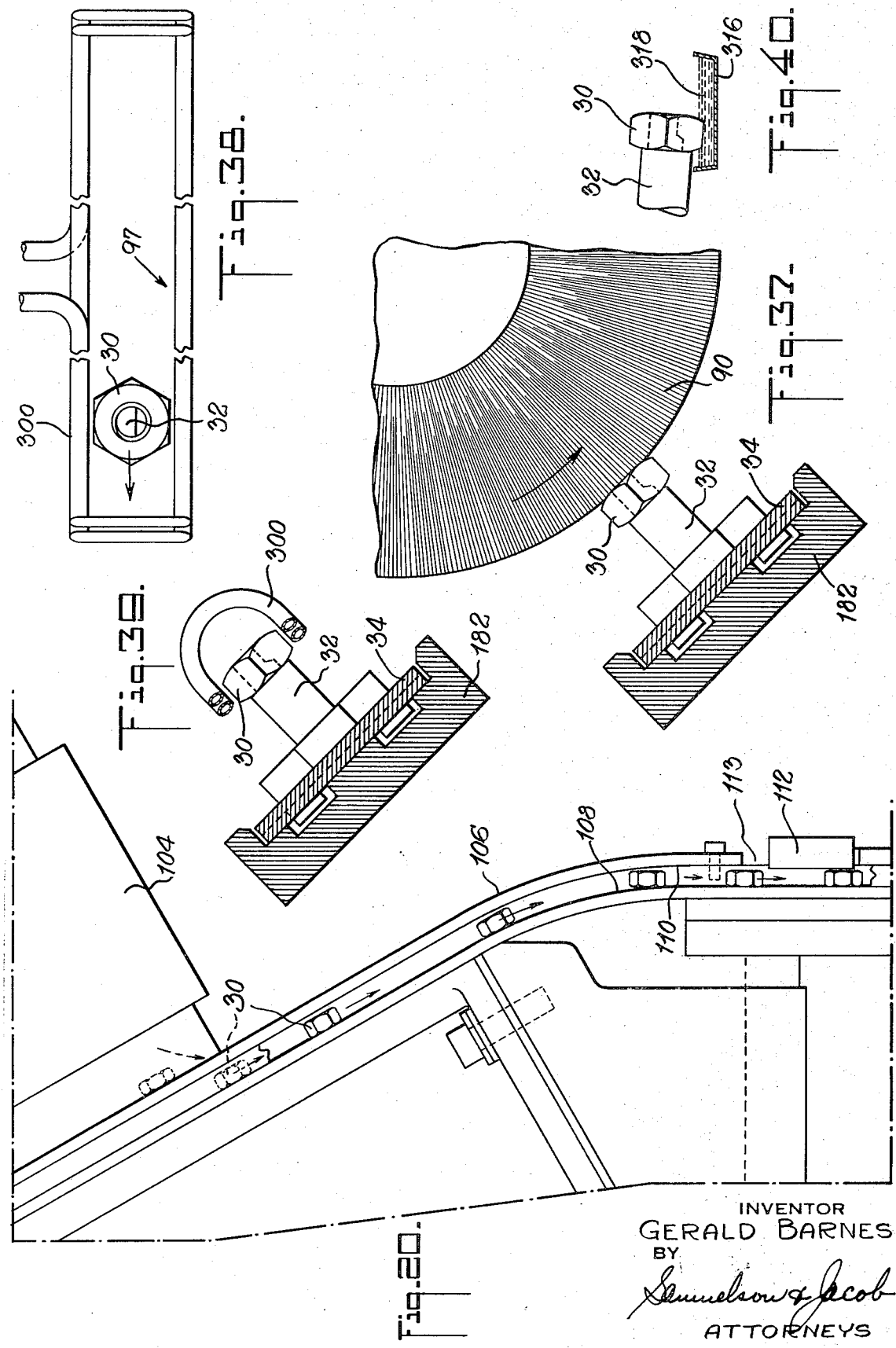

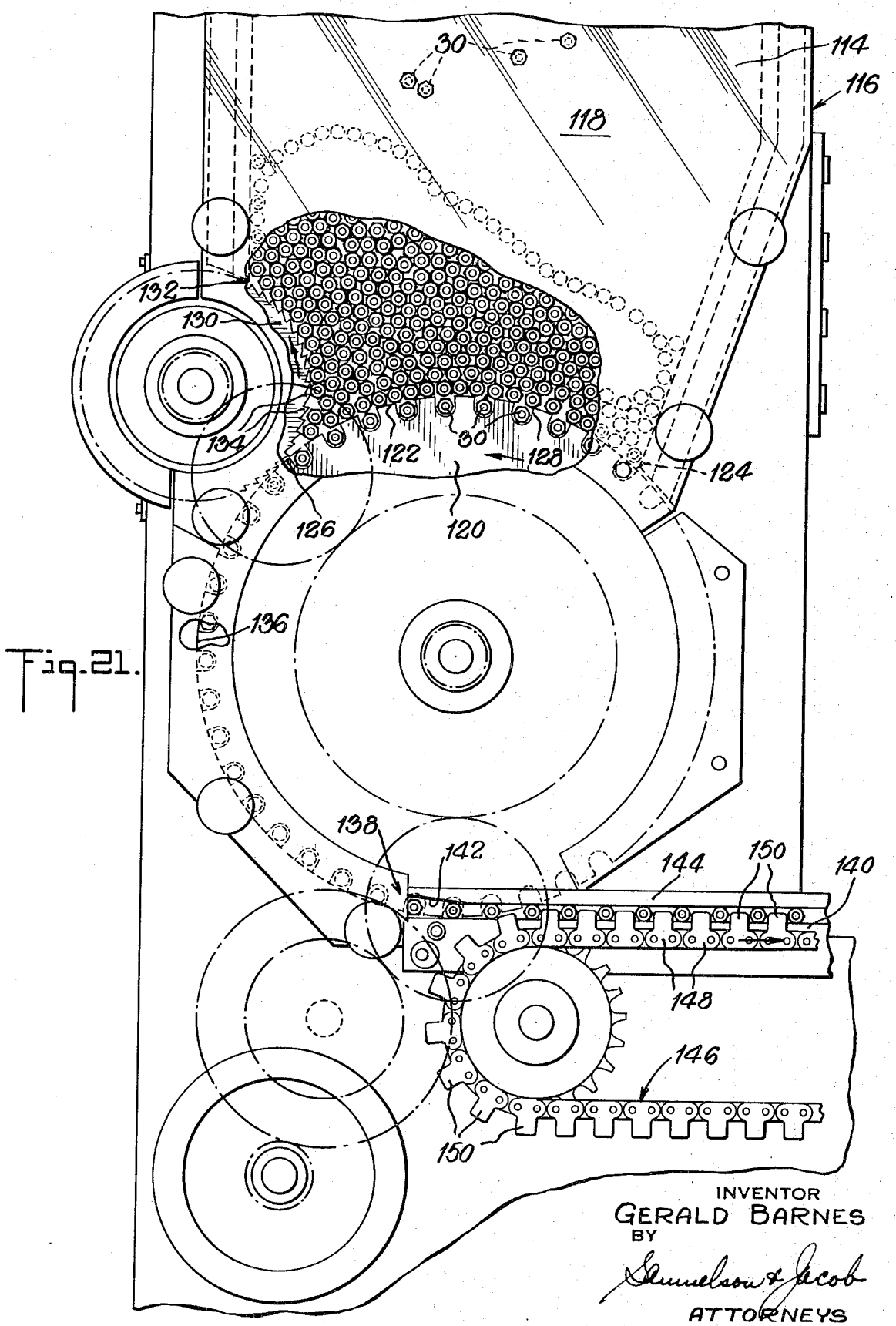

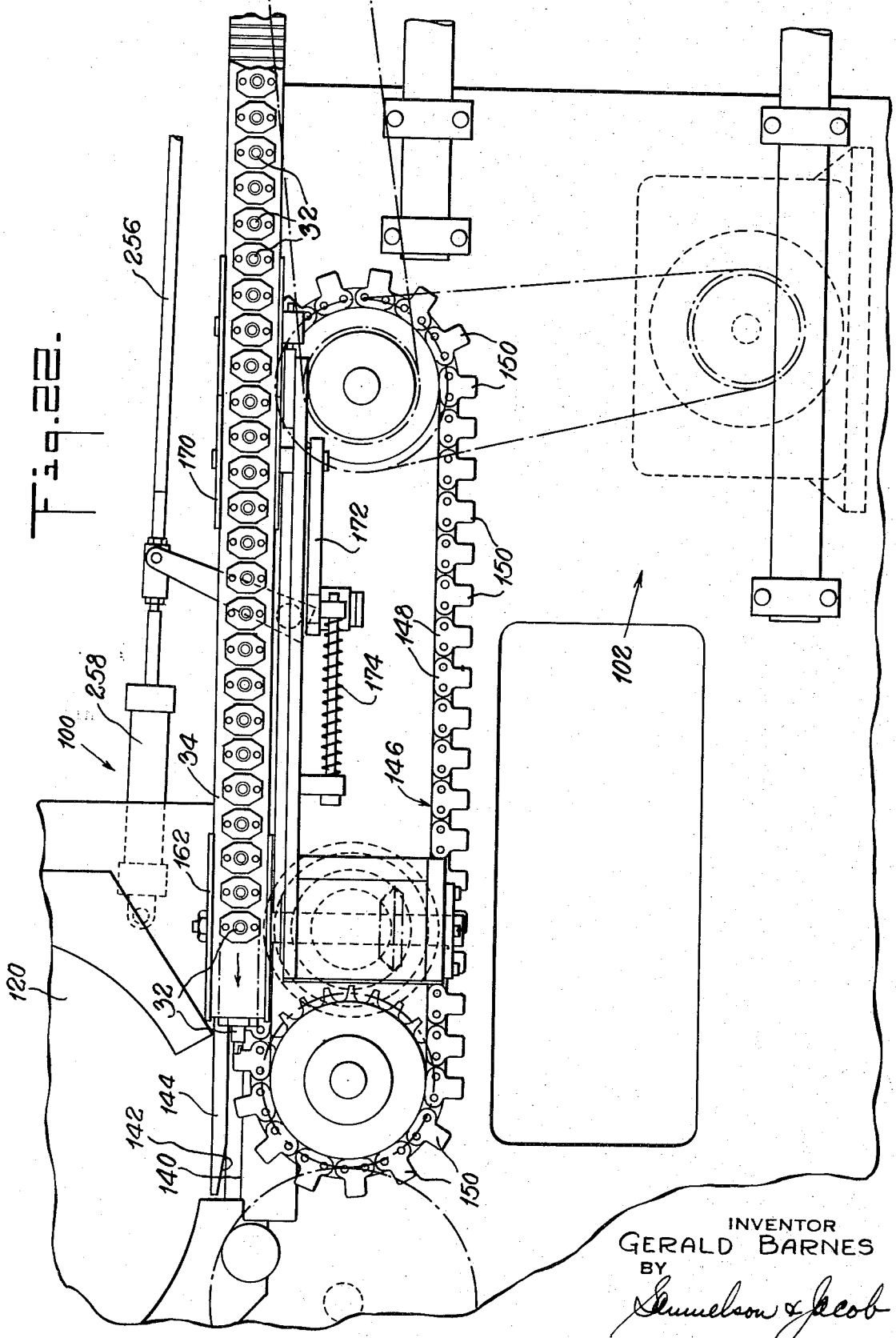

INVENTOR
GERALD BARNES
BY
Samuelson & Jacob
ATTORNEYS

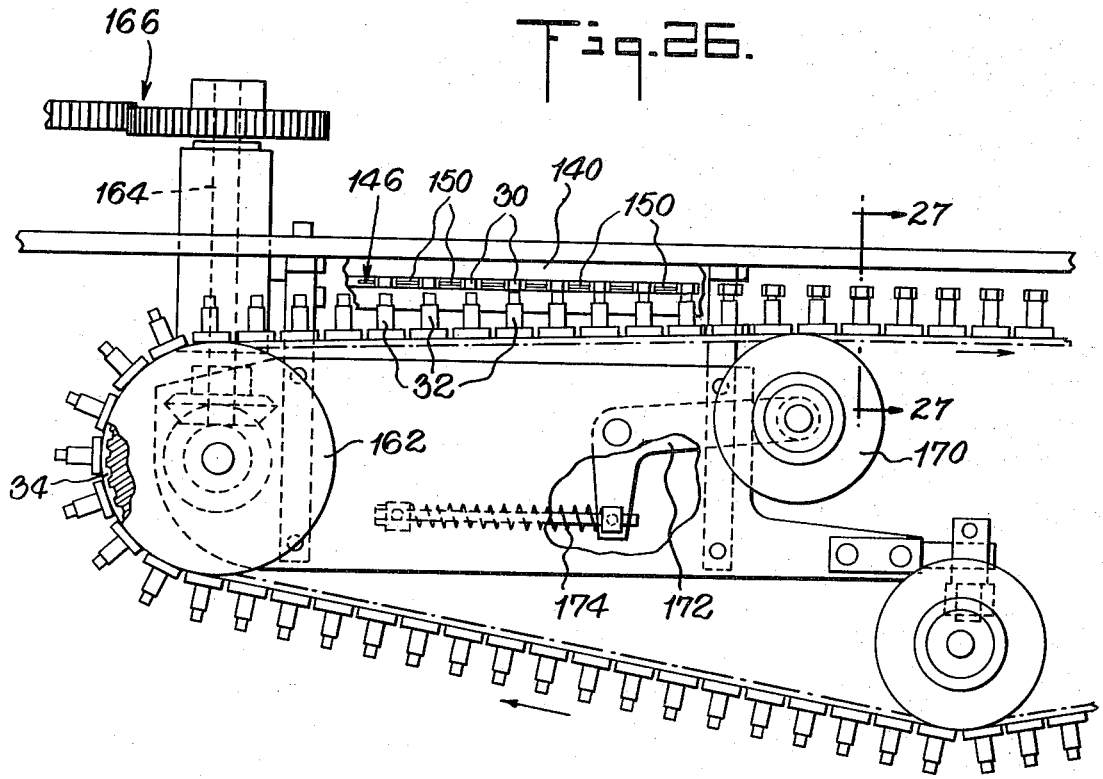
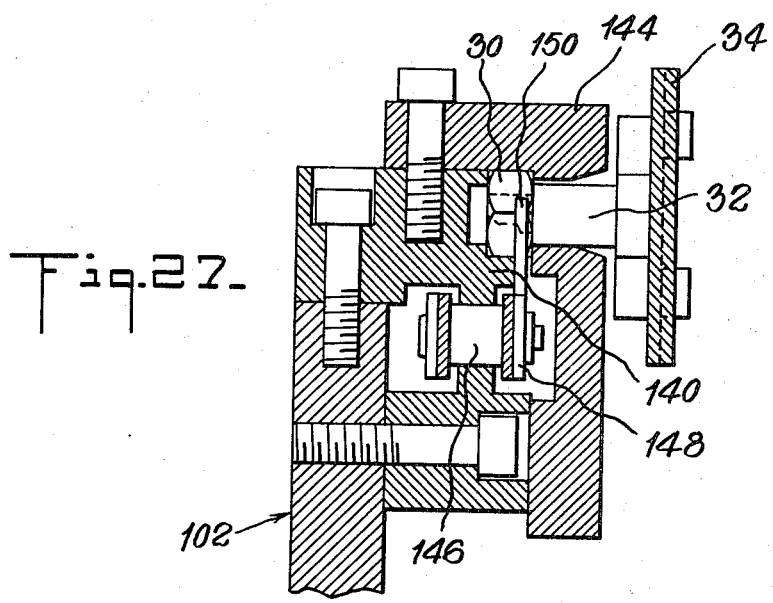

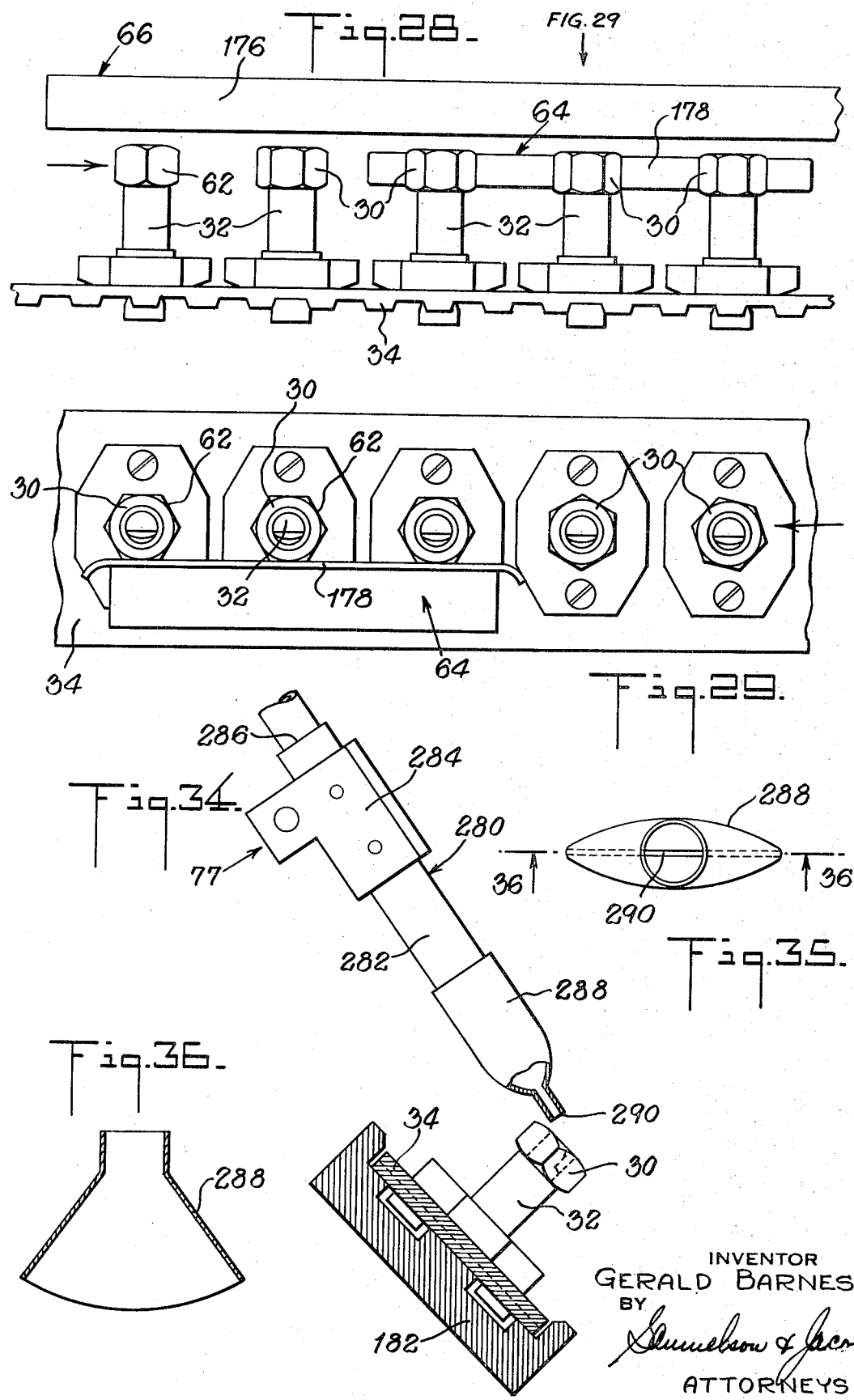

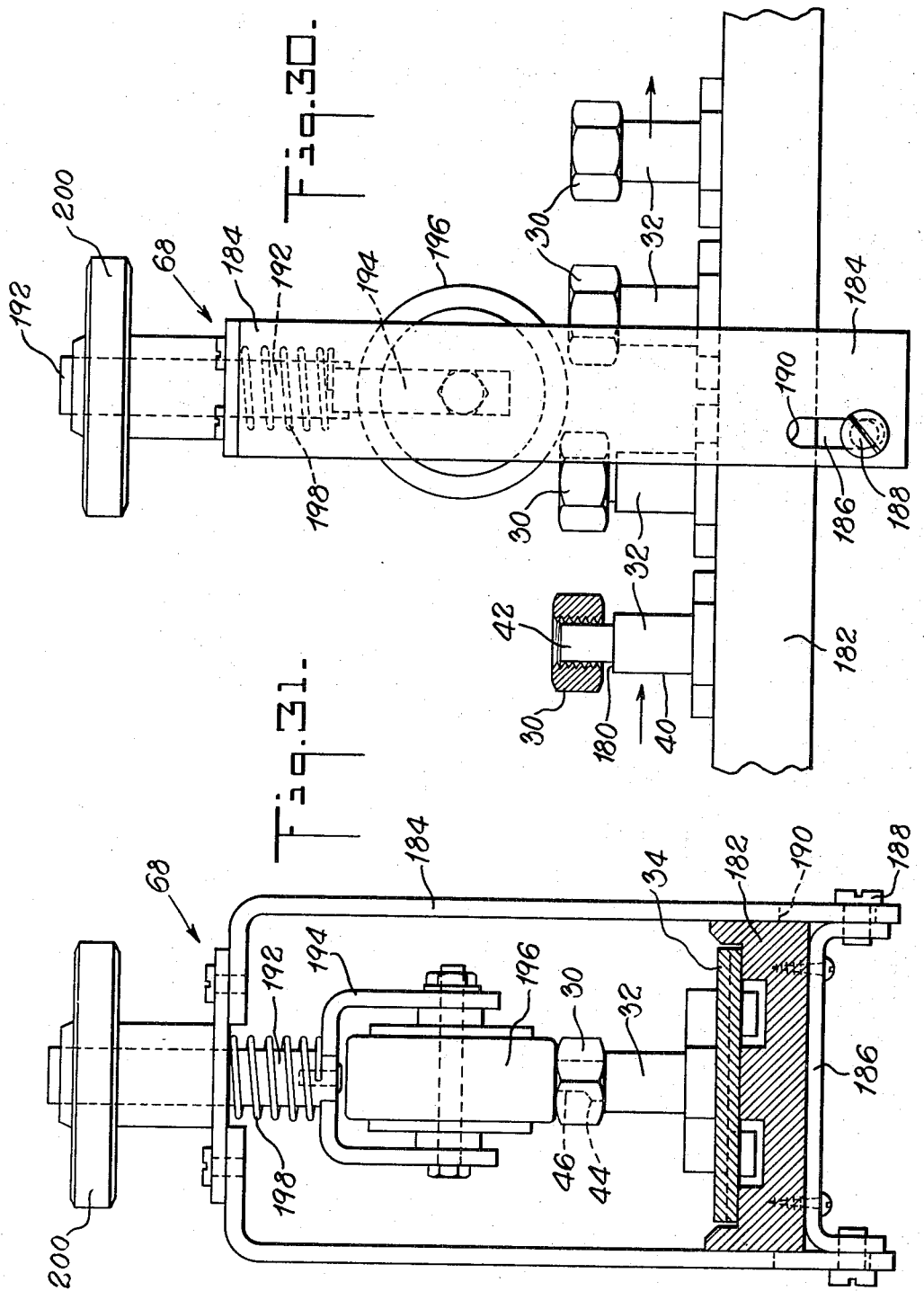

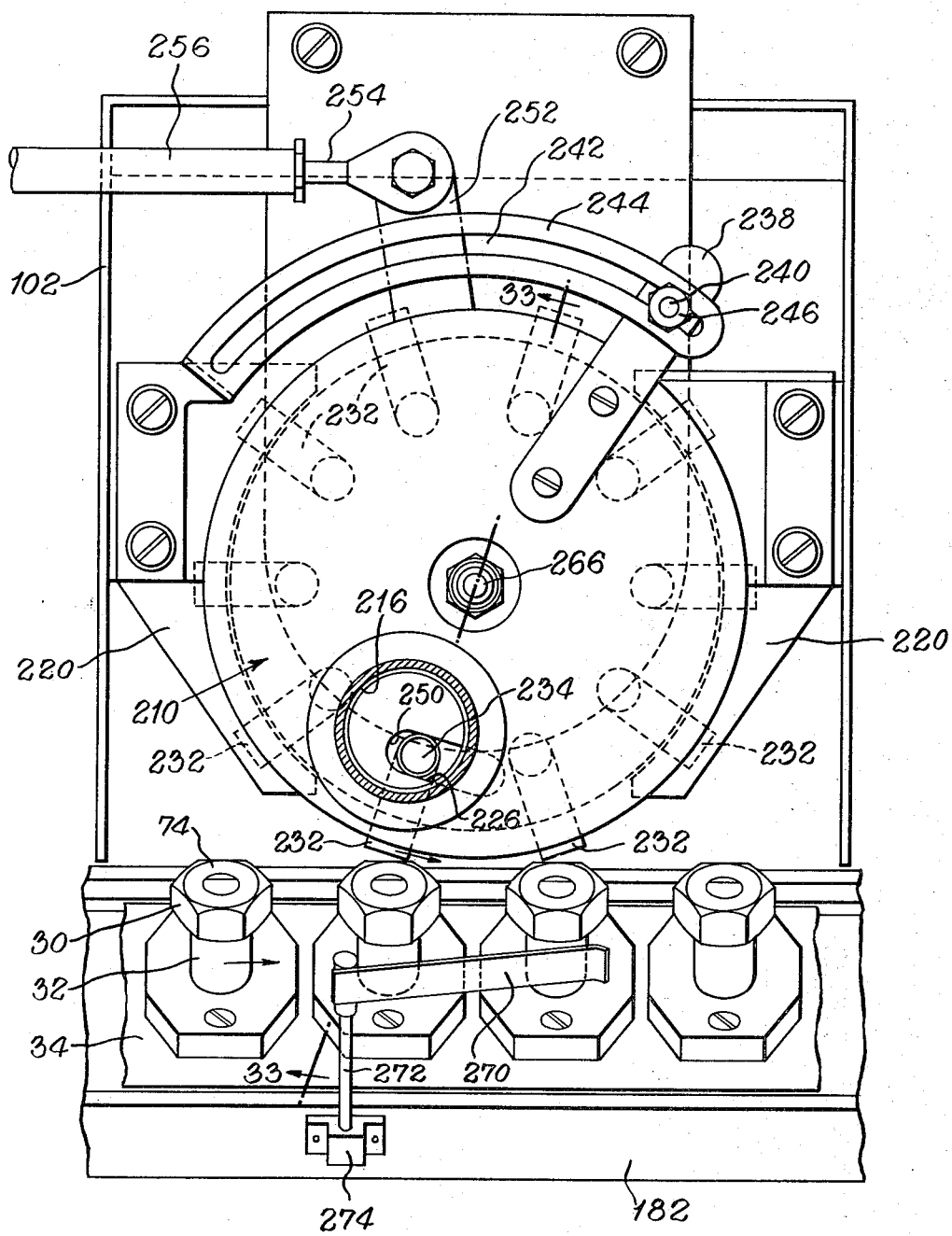

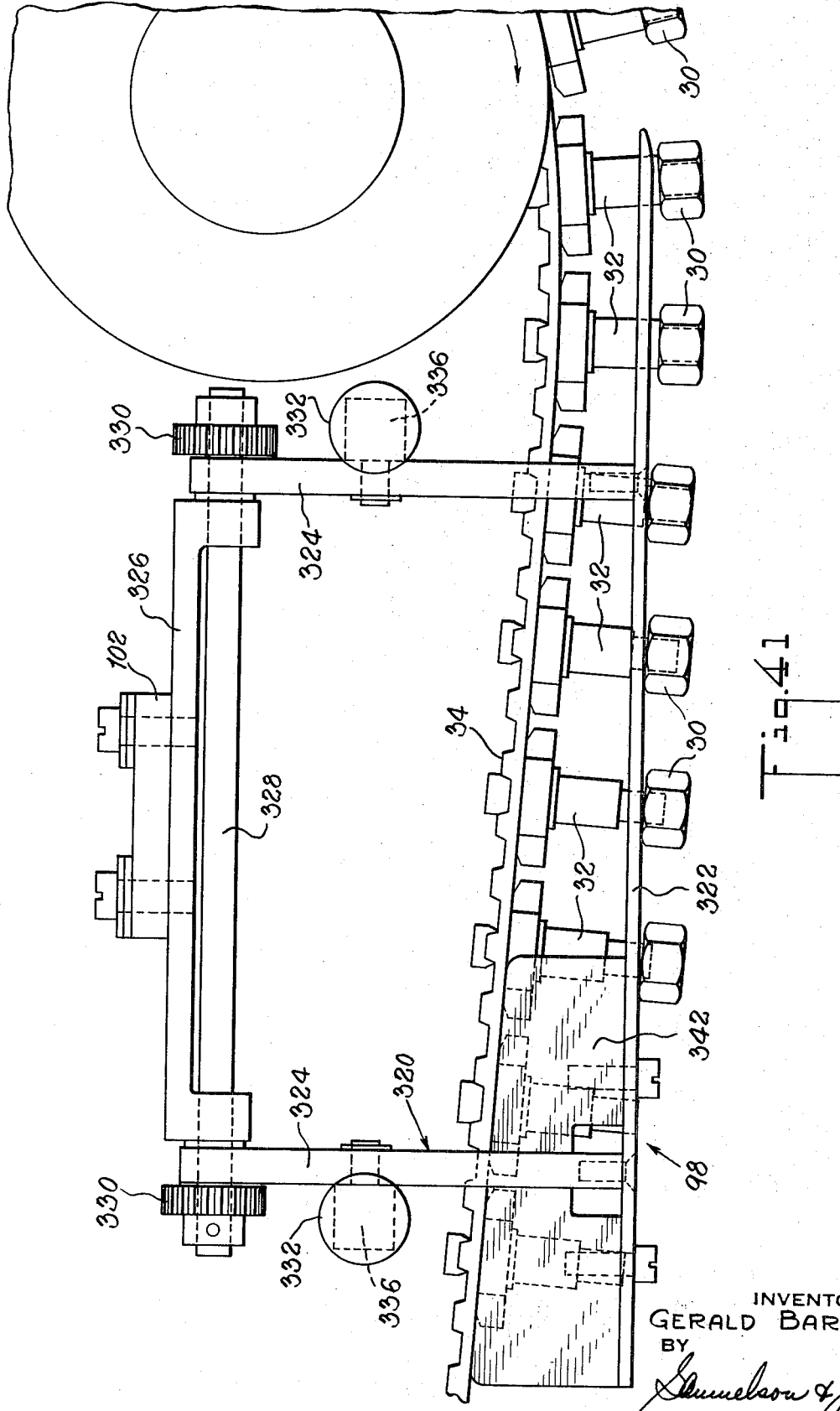

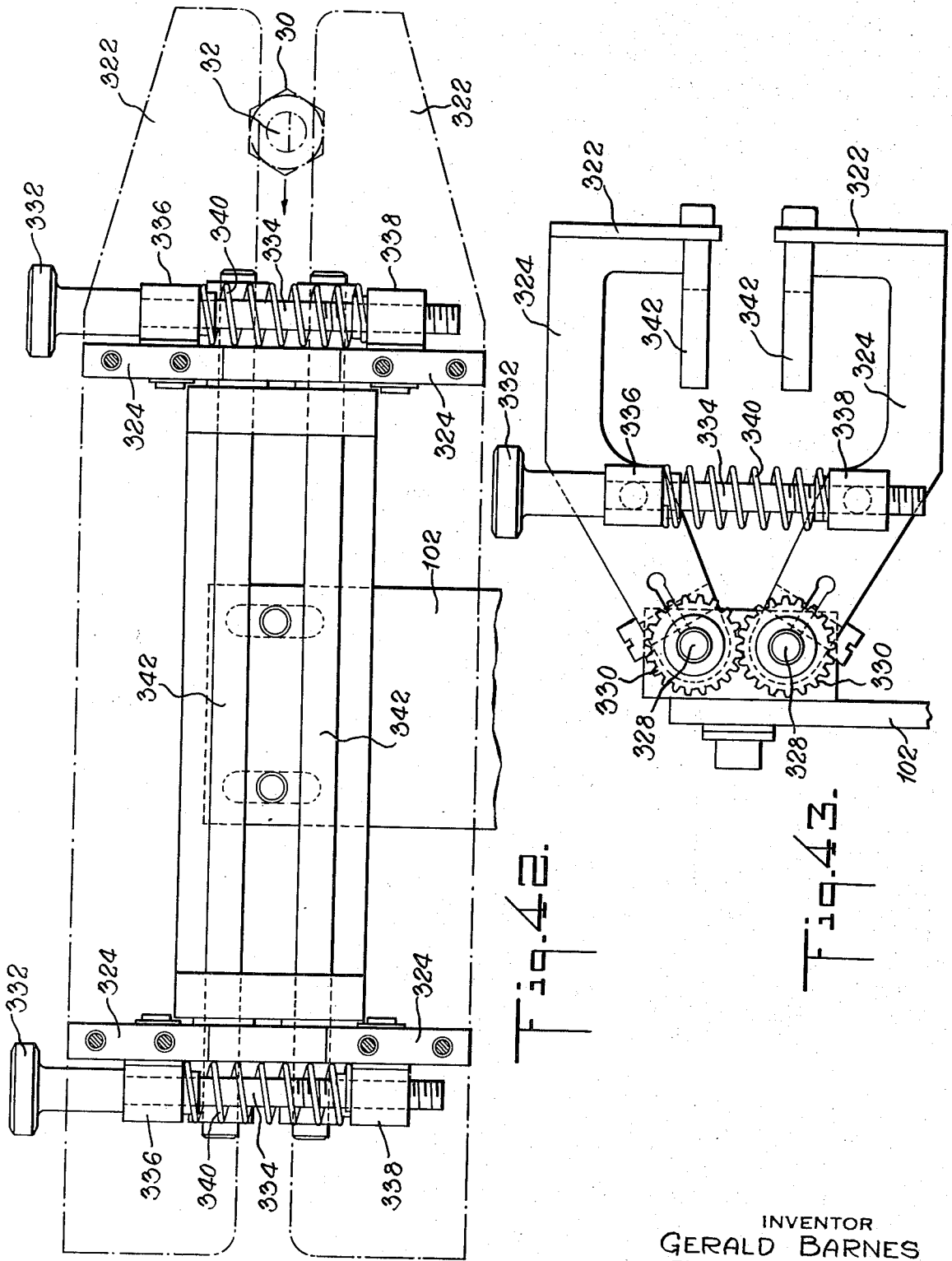

United States Patent Office 3,830,902
Patented Aug. 20, 1974

3,830,902
METHOD AND APPARATUS FOR MAKING SELF-LOCKING INTERNALLY THREADED FASTENERS
Gerald Barnes, Brooklyn, N.Y., assignor to Amerace Esna Corporation, New York, N.Y.
Continuation of abandoned application Ser. No. 554,096, May 31, 1966. This application Feb. 25, 1969, Ser. No. 802,090
Int. Cl. B29d 1/00
U.S. Cl. 264—267
48 Claims

ABSTRACT OF THE DISCLOSURE

Method and apparatus for making self-locking internally threaded fasteners in which the self-locking characteristic is derived from a free-form plastic patch of limited axial and circumferential extent adhered to the thread-defining surface of each such fastener by establishing a deposit of plastic powder upon the thread-defining surface of the fastener with the longitudinal boundaries of the deposit spaced axially from both ends of the surface and heating the fastener to fuse the powder deposit and establish a patch adhered to the thread-defining surface. The fasteners are each seated upon a pin having a cavity-forming portion such that a cavity is established between the pin and the fastener thereon and the deposit of plastic powder is placed within the cavity. An excess amount of plastic powder is deposited within the cavity and unwanted powder is subsequently removed from at least one end of the deposit to establish a longitudinal boundary spaced from the corresponding end of the thread-defining surface.

---

This application is a continuation of application Ser. No. 554,096 filed May 31, 1966 now abandoned.

The present invention relates generally to a method and apparatus for making self-locking internally threaded fasteners or other internally threaded members and pertains, more specifically, to a method and apparatus for making self-locking fasteners wherein the self-locking characteristic is derived from a free-form resiliently deformable plastic patch adhered to the thread-defining surface of the fastener.

Self-locking internally threaded members and especially nuts having inserts of resiliently deformable plastic have found wide acceptance in those areas of use where the advantages offered by such fasteners and members justify their relatively high cost of manufacture. Efforts to reduce the cost of manufacture and thereby enlarge the areas where the use of such fasteners and other members would be economically feasible have met with negligible success over a period of many years since the introduction of these fasteners and members. Aside from the higher cost of nuts with plastic inserts, these nuts suffer from the requirement for the formation of a groove or other recess in the body of the nut to receive and retain the insert therein, which requirement tends to reduce the strength of the nut or calls for an increase in the dimensions of the body, as well as an increase in the number and complexity of operations in manufacturing methods and apparatus.

Earlier efforts to simplify manufacturing operations and thus reduce manufacturing costs have led to the suggestion that a preformed pellet of plastic material could be secured to the thread-defining surface of an externally threaded fastener or screw of standard thread form by the simultaneous application of heat and pressure. Such a process requires the use of relatively high cost, preformed die members for applying the requisite deforming pressures to the plastic pellet and a preheated fastener on which the pellet is placed to melt the engaged surface of the plastic pellet. Neither the process nor the resulting product has been found to be entirely satisfactory for its intended purpose and little, if any, saving in cost of manufacture has been found to result. It has been found, also, that the adherence of the die-deformed plastic pellet to the metal surface of the fastener is frequently, because of the "elastic memory" of the deformed pellet, insufficient to withstand the normal shearing and stripping forces applied thereto by the thread of a complementary internally threaded fastener element or nut as it is threaded on the screw. This stripping, or peeling, of the plastic pellet from the nut thread precludes reuse of the externally threaded element or screw. It has been found that if the die deformed pellet is initially properly dimensioned to create a desired locking torque below a maximum allowable on initial application the locking torque on subsequent application is frequently of a value below the minimum desired in a reusable self-locking screw. Undesirable stresses of significant magnitude are created at the metal-plastic interface and these stresses, in effect, reduce the adherence capabilities. The adherence of the preformed plastic pellet to the fastener is therefore unreliable and unpredictable. Moreover, such a method is not feasible for the manufacture of self-locking internally threaded members or fasteners such as nuts since it is exceptionally difficult to place preformed die members within the bore of an internally threaded member, and especially within small bores, and have such die members perform the operations necessary to secure a preformed pellet to the thread.

Various proposals have been advanced for the die-form molding of complete rings of plastic materials in the thread root area of nuts and screws of special thread forms where the nuts or screws form a part of the molding dies but such processes have been found unsatisfactory as being unadaptable to mass production methods of manufacture and the resulting products have been found unsatisfactory by reason of the insufficiency of the bond between the metal and the plastic to withstand the normal stripping and shearing forces of the thread of the complementary threaded element. Other mechanical and chemical defects and insufficiencies have also precluded qualification of the products as reusable self-locking fasteners.

It is therefore an object of the invention to provide a method and apparatus for manufacturing a self-locking internally threaded fastener or other internally threaded member in which the self-locking characteristic is derived from a resiliently deformable plastic patch to securely adhered to the thread-defining surface of the fastener as to permit a sufficient number of re-uses of the fastener with adequate locking torque to qualify the fastener as a reusable self-locking fastener.

Another object of the invention is to provide a method and apparatus for manufacturing self-locking internally threaded fasteners or other such members utilizing the elastic memory of a plastic patch to maintain adequate locking torque over a number of reuses, which method and apparatus eliminates costly manufacturing operations heretofore required to provide mechanical means adequate to retain plastic inserts in operative association with the thread of a fastener.

Still another object of the invention is to provide a method and apparatus for making self-locking internally threaded fasteners or other internally threaded members in which the self-locking characteristic is derived from a free-form plastic patch adhered to the thread-defining surface of the fastener by establishing a deposit of plastic powder of controlled dimensions upon the thread-defining surface and causing the powder to fuse and adhere to the thread-defining surface to establish the desired patch.

A further object of the invention is to provide a method and apparatus for making an internally threaded self-locking fastener or other member of the type described wherein the fastener is seated upon a pin having a cavity-forming portion cooperating with a corresponding portion of the thread-defining surface of the fastener to establish a cavity and plastic powder is deposited upon the thread-defining surface in the cavity and fused to establish a plastic patch adhered to the thread-defining surface.

Other and further objects of the invention are to provide a method and apparatus for making a threaded fastener or other such member with a self-locking plastic patch of such form and configuration, and so adhered to the thread surfaces as to minimize or wholly eliminate the stripping of the plastic material from the fastener element; to provide a method and apparatus for making a metal fastener of standard internal thread form with a plastic patch or coating adequate in size and form and in adherence to the metal surface of the thread to create the necessary self-locking torque when used with a complementary threaded element of standard thread form and within standard dimensional limits; to provide a method and apparatus for making an internally threaded fastener with a plastic self-locking patch or coating having the leading boundaries thereof gradually merging into the thread defining surfaces of the fastener to minimize the stripping component of the forces exerted on the patch or coating by the thread defining surfaces of the mating element; to provide a method and apparatus for making an internally threaded fastener with a free-form plastic patch, i.e., a patch of plastic material formed without application of work shaping or molding pressures, securely bonded to the root, flank and crest surfaces throughout a limited angular extent and for a predetermined number of thread convolutions; to create an internally threaded self-locking fastener with a locking torque within a desired maximum-minimum range of values both on initial application and on re-use; to provide a method and apparatus for making an internally threaded fastener with a self-locking plastic patch of predetermined angular extent and of selected materials allowing adequate resilient elongation and deformation of the material to accommodate a mating element having thread form dimensions within standard specifications; to provide a method and apparatus for making an internally threaded fastener with a self-locking plastic patch of fused powder strongly adherent to the metal surface of the fastener and of such predetermined, limited extent that non-coated areas adjacent to the patch are adequate to accommodate any excess plastic that may be displaced or deformed by the complementary threaded element; to provide a method and apparatus for making an internally threaded fastener with a self-locking plastic patch of fused powder substantially free from adherence reducing internal stresses; and to provide a method and apparatus for making an internally threaded fastener with a self-locking plastic patch formed by the free flow of melted plastic over the thread-defining surfaces of a predetermined number of thread convolutions as determined by a controlled deposit of powder on a selected axially or longitudinally defined area as well as an angular or circumferentially defined area of the fastener thread.

The invention will be more fully understood and further objects and advantages thereof will become apparent in the following detailed description of embodiments of the invention illustrated in the accompanying drawing, wherein:

FIG. 1 is a plan-view of a threaded fastener or member shown in the form of a nut constructed in accordance with the teachings of the invention;

FIG. 2 is a cross-sectional view taken along line 2—2 of FIG. 1;

FIG. 3 is a cross-sectional view taken along line 3—3 of FIG. 1;

Figure 23:
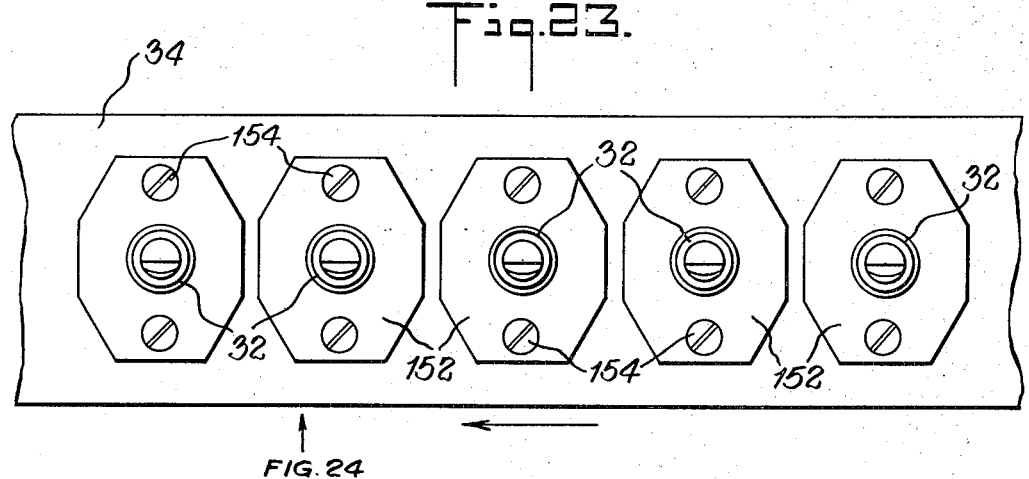
Figure 24:
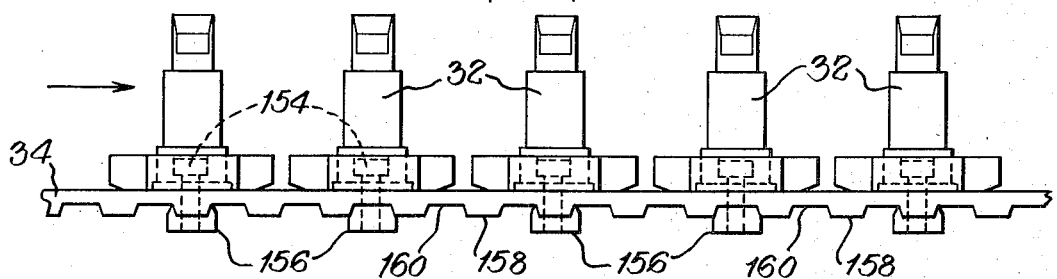
Figure 25:
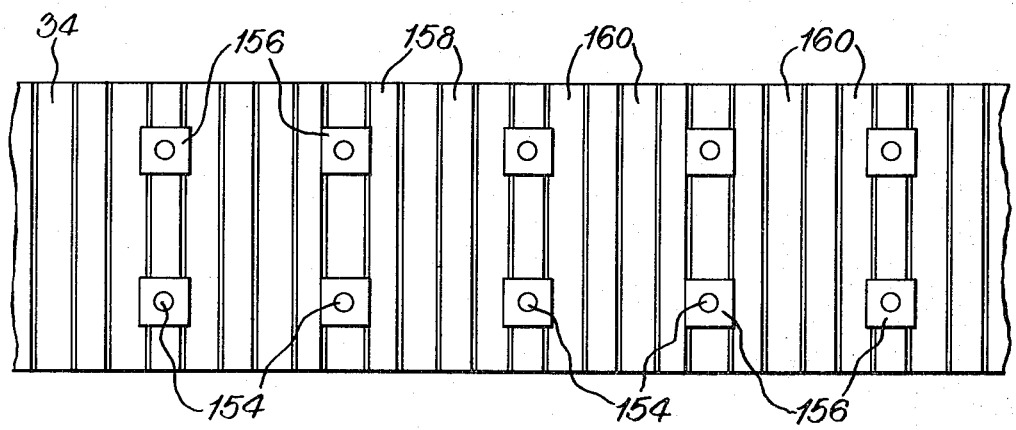
Figure 33:
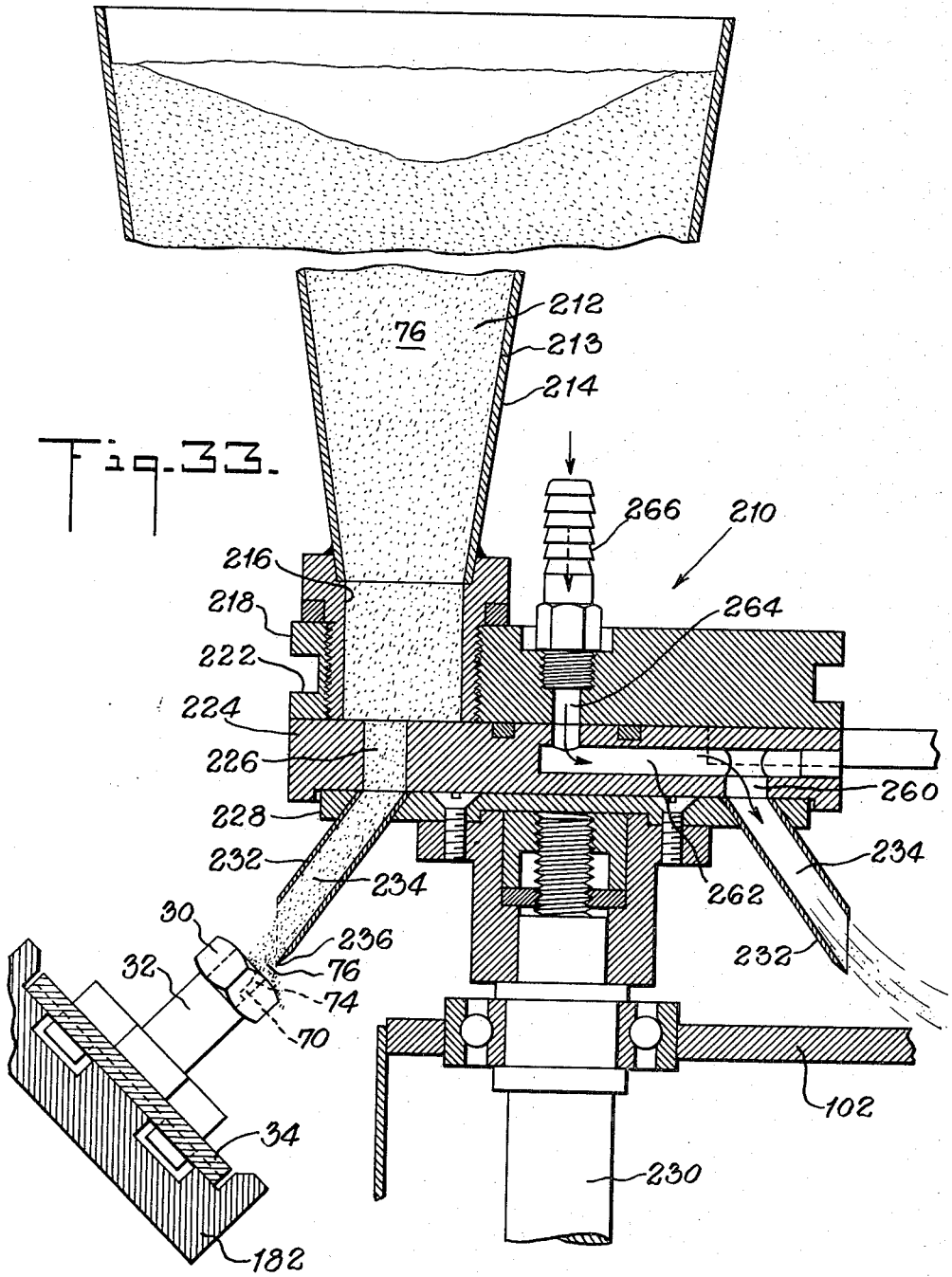

FIGS. 4 and 5 constitute a diagrammatic illustration of a method and an apparatus for carrying out the invention;

FIG. 6 is an elevational view of a pin employed in the illustrated embodiment of the invention;

FIG. 7 is an end view of the pin of FIG. 6;

FIG. 8 is a plan view of the pin of FIG. 6;

FIG. 9 is an elevational view of an alternate pin;

FIG. 10 is an end view of the pin of FIG. 9;

FIG. 11 is a plan view of the pin of FIG. 9;

FIGS. 12 through 18 are diagrammatic illustrations depicting a method of the invention, FIG. 18 is on the same sheets as FIGS. 14 through 16;

FIG. 19 is a side elevational view of an apparatus constructed in accordance with the invention and is on the same sheet as FIGS. 1 through 3;

FIG. 20 is an enlarged detail taken along line 20—20 of FIG. 19;

FIG. 21 is an enlarged elevational view, partially sectioned, showing a hopper of the invention;

FIG. 22 is an enlarged detail, in elevation, illustrating a portion of the apparatus of FIG. 19;

FIG. 23 is a front elevational view of a belt employed in the apparatus of FIG. 19;

FIG. 24 is a bottom plan view of the belt viewed in the direction of the arrow in FIG. 23;

FIG. 25 is a rear elevational view of the belt of FIG. 23;

FIG. 26 is an enlarged plan view supplementing the detail shown in FIG. 22;

FIG. 27 is an enlarged cross-sectional view taken along line 27—27 of FIG. 26;

FIG. 28 is an enlarged plan view of a portion of the apparatus of FIG. 19 showing the nut aligning means;

FIG. 29 is a front elevational view of the nut aligning means viewed in the direction of the arrow in FIG. 28;

FIG. 30 is an enlarged end elevational view illustrating another detail of the apparatus of FIG. 19 showing the nut seating means;

FIG. 31 is a plan view of the detail of FIG. 30;

FIG. 32 is an enlarged plan view illustrating a further detail of the apparatus of FIG. 19 showing the powder distributor;

FIG. 33 is a cross-sectional view taken along line 33—33 of FIG. 32;

FIG. 34 is an enlarged elevational view illustrating a detail of the apparatus of FIG. 19, the detail including the nozzle of the blower means and is on the same sheet as FIGS. 28 and 29;

FIG. 35 is an end view of the nozzle of FIG. 34 and is on the same sheet as FIGS. 28, 29 and 34;

FIG. 36 is a cross-sectional view taken along line 36—36 of FIG. 35 and is on the same sheet as FIGS. 28, 29, 34 and 35;

FIG. 37 is an enlarged elevational view of a detail of the apparatus of FIG. 19, the detail including a rotary brush and is on the same sheet as FIG. 20;

FIG. 38 is an enlarged front elevational view illustrating a further detail of the apparatus of FIG. 19, the detail including the heating means and is on the same sheet as FIGS. 20 and 37;

FIG. 39 is an end elevational view of the detail of FIG. 38 and is on the same sheet as FIGS. 20, 37 and 38;

FIG. 40 is an enlarged elevational view of still another detail of the apparatus of FIG. 19 showing a cooling water trough and is on the same sheet as FIGS. 20, 37, 38 and 39;

FIG. 41 is an enlarged plan view of another detail of the apparatus of FIG. 19 showing the stripper means;

FIG. 42 is a front elevational view of the detail of FIG. 41;

FIG. 43 is an end elevational view of the detail of FIG. 41;

FIG. 44 is an enlarged plan view of further detail of the apparatus of FIG. 19 showing cleaning brushes and is on the same sheet as FIG. 17; and FIG. 45 is an end elevational view of the detail of FIG. 44 and is on the same sheet as FIGS. 17 and 44.

Referring now to the drawing, and in particular to FIGS. 1 through 3, a self-locking internally threaded fastener in which the self-locking characteristic is derived from a free-form plastic patch is illustrated in the form of nut 10 having a solid body 12 with a thread-defining surface 14 extending axially along an aperture 16 through the body and a free-form plastic patch 18 adhered to the thread-defining surface 14. The plastic patch has a limited axial and circumferential extent, the length of the patch being confined axially or longitudinally between laterally extending longitudinal boundaries 20 and the width of the patch being defined by longitudinally extending lateral boundaries 22. Each of the longitudinal boundaries 20 is displaced from a corresponding end 24 of the thread-defining surface so as to provide a lead-on thread 26 at each end of the nut for facilitating the initial engagement of nut 10 with a mating threaded stud without interference from the patch.

As best seen in FIG. 2, the radial depth, or thickness of the plastic patch gradually increases longitudinally from either end of the patch toward the middle of the patch. Likewise, the thickness of the patch increases circumferentially from either side toward the center of the patch.

As best illustrated in FIG. 3, the patch tapers from a maximum circumferential width near the longitudinal center thereof toward either end.

The particular configuration of the plastic patch attains a gradual build-up of deforming pressures when the nut is threaded onto a mating threaded stud and the forces, or components thereof, applied initially to the boundaries of the plastic patch in a direction tending to cause stripping or peeling of the plastic material from the thread-defining surface are substantially reduced or eliminated. Thus, the maximum forces necessary for locking torque are applied to a location remote from the edge of the patch and are ineffectual to effect a peeling of the patch.

The inherent tendency of a properly selected resiliently deformable plastic material to return to its original form permits a substantial number of reuses of the fastener.

In the preferred example, a polyamide resin powder, specifically nylon 11, was used as the patch material and provided initial and reuse torques well within the values necessary to qualify the product as a reusable self-locking nut. Other resiliently deformable plastic materials possessing also certain other essential characteristics and properties, as hereinafter described, may be used in place of the polyamide resin powder and the circumferential extent of the plastic patch and its longitudinal length and taper may be varied as required to obtain initial and reuse torques meeting the qualifying standards or specifications for reusable self-locking nuts.

Lock nut 10 is manufactured by establishing a deposit of plastic powder upon the thread-defining surface of a standard nut and heating the body of the nut and the powder deposit to fuse the powder deposit and establish the plastic patch adhered to the thread-defining surface. Thus, the present invention may be practiced with nuts of standard manufacture. When starting with such a nut, it is preferable to first dip it in a weak acid solution to remove dirt, grease and other foreign matter and to provide clean and, where necessary, roughened, thread-defining surfaces so as to assure maximum wetting of the thread surface by the plastic material when in melted condition and thereby assure firm adherence of the plastic to the body of the nut. A metered quantity of fine plastic powder is then deposited on the nut thread in such amount and so distributed that when melted the plastic will, under the action of gravity, and as determined by surface tension, take the form and configuration described above.

Turning now to FIGS. 4 and 5, both a method and apparatus of the invention are illustrated diagrammatically to show the progress of a nut 30 through various stations which perform a series of operations, each of which will be described in detail below. Each nut 30 is placed upon a pin 32 and the pin is preferably transported through the apparatus to present the nut to the various stations which must perform the desired operations upon the nut. In the preferred apparatus a series of pins 32 is fixed to carrier means shown in the form of an endless belt 34 which moves continuously to transport each pin 32 and the nut 30 carried thereon through the various stations. Initially nuts 30 are fed by feed means 36 in synchronism with the movement of the belt 34 so that one nut is placed upon each pin. A typical pin 32 is illustrated in FIGS. 6 through 8 and is seen to include a shank portion 40 which is fixed to the belt 34 in a manner which will be more fully described below and an arbor portion 42 of reduced diameter projecting therefrom, the diameter of the arbor portion 42 corresponding generally with the inside diameter of the thread-defining surface of the particular nut to which a plastic patch will be applied. The arbor portion 42 is provided with a sealing shoulder 44 and an undercut 46 for purposes which will be described shortly. In the fabrication of relatively small nuts, the undercut 46 is preferably provided with an axially directed portion 48 and an angled relief portion 50. When working with larger nuts the undercut may have a single-angled surface such as that illustrated in FIGS. 9 through 11 where an alternative pin 52 is shown having a shank portion 54 and an arbor portion 56, the arbor portion 56 being provided with a sealing shoulder 58 and a single-angled undercut 60.

Following, now, a single nut 30 through the method and apparatus of the invention, the nut is first placed upon a pin 32 by the engagement of the arbor portion 42 of the pin within the aperture of the nut. If the nut 30 is not already oriented with one of the flat wrench faces 62 (also see FIGS. 28 and 29) facing downwardly, the nut is reoriented by a nut alignment means 64 (see FIG. 4) to assure that a wrench face 62 faces downwardly. Any electrostatic charge which may be present on the pin and on the nut body is discharged by a discharge means 66.

The pin and nut are then passed through a nut seating means 68 to assure that the nut is fully seated upon the pin. When the nut is fully seated upon the pin, the arbor portion 42 and the sealing shoulder 44 thereof engage the thread-defining surface of the nut and, as best seen in FIGS. 12 and 13, the undercut 46 cooperates with the aperture of the nut to serve as a cavity-forming portion for establishing a cavity 70 between the arbor portion 42 and a portion 72 of the thread-defining surface of the nut, the angled relief portion 50 of the undercut 46 providing a clear opening 74 into the cavity 70. Powdered plastic 76 is poured into the cavity through the opening 74 by powder distributor means 75 (see FIG. 4) and is preferably supplied in excess of that amount required for the formation of a patch to assure that the cavity is filled with powder. During the cavity filling operation, the pin is tilted at an angle to the horizontal, as illustrated, so that the powder 76 may be dropped into the cavity 70 and will be retained therein while the pin is transported from station to station. The magnitude of the angle is determined largely by the nut size, which will establish the size of the cavity and determine the accessibility of the cavity, and the thread form, including the thread face angle, which can affect the distribution of the powder. An optimum angle for nuts of standard sizes has been found to be in the range of about 30° to 50° from the horizontal. In order to remove the excess powder from the cavity and establish the correct amount of powder necessary for the desired patch, a removal means 77 is included to provide stream of air 78 which is directed against the pin and the nut, as seen in FIGS. 14 and 15, and which stream blows away the excess powder and exposes at least one convolution 80 of the thread-defining surface to establish a lead-in thread at the end 82 of the nut. The pin 32 preferably does not project beyond end 82 of the nut so that the flow of air into the cavity is not disturbed and turbulence, which could cause irregularities in the deposit, is avoided. It is noted that a lead-in thread 84 is already provided at the other end 86 of the nut by virtue of the masking of at least one convolution of the thread-defining surface at that end by the sealing shoulder 44. After subjecting the nut to the stream of air, any small deposits 88 of powder on the face of the nut or on the end of the pin are removed by subjecting the nut and pin to the action of a rotary brush 90 as seen in FIG. 16. A second electrostatic discharge means 91 (FIG. 4) is juxtaposed with brush 90 to discharge any electrostatic charge which might form upon the brush. Where extra-heavy nuts of greater axial length are employed in the described process, such as nut 92 illustrated in FIG. 17, an auxiliary jet of air 94 supplied by an auxiliary nozzle 95 has been found effective in removing any unwanted residual powder from those portions 96 of the thread-defining surface extending beyond the end of the pin upon which such an extra-heavy nut 92 is seated. The alternative pin form of pin 52 is shown in use in FIG. 17. Once the correct deposit of powdered plastic is established within the cavity 70, and all excess powder is removed from the nut, the pin and the nut thereon are transported to heating means 97 which will heat the body of the nut and the deposit of plastic powder to fuse the powder, as seen in FIG. 18, and establish a plastic patch adhered to the thread-defining surface of the nut. The heating is preferably accomplished by induction heating means which will heat the external surfaces of the nut body so that heat is conducted from the external surfaces to the internal thread-defining surface and to the deposit of plastic powder. Such a heating procedure allows control over the temperature established in the powder deposit and over the gradients in temperature so that fusion of the deposit first occurs at the thread-defining surface and subsequently occurs at increasing distances away from the thread-defining surface within the deposit. The orientation of the nut with the wrench face facing downwardly aligns the powder deposit with the thinner portion of the body of the nut enabling heat to be conducted from the outer surface of the body to the patch more rapidly. Moreover, consistent alignment of the nuts upon the pins achieves consistent results in that each powder deposit in each nut will be raised to the same temperature, thereby enhancing control in the process. After fusion of the deposit to establish the patch the assembled nut and patch are cooled and subsequently stripped from the pin by stripper means 98.

For the purposes of commercial production, it has been found advantageous to maintain the plastic in a molten state for only a relatively brief time so that each nut need not be retained on a corresponding pin for an inordinate length of time. Thus, the heating attained by the induction heating means 97 is advantageously limited to that which will fuse the powder particles to one another and to the thread-defining surface of the nut. After the nut is stripped from the pin, the nut with the plastic patch adhered thereto is subjected to a baking operation wherein the nut and the plastic patch are both heated to a temperature where the plastic once again becomes molten, and the temperature is maintained for a relatively long time. The baking operation will serve to eliminate air which is ordinarily entrapped in the plastic patch as a result of the brief time at which the plastic remained molten during initial heating when the nut was on the pin. The relatively brief time of the initial heating generally does not allow the slow moving air bubbles within the patch to escape. Such air bubbles reduce the adherence capabilities of the plastic to the nut and affect the density of the melted plastic. In addition, the baking operation, when carried out on batches of nuts, will provide enough time at a sufficiently elevated temperature to allow the patches on all nuts in a batch to flow and wet the thread-defining surface so that a smooth, tapered configuration as described above is attained uniformly throughout a batch of nuts.

Plastic material of a type suitable for the above purpose will, when heated to its melting temperature, more or less readily flow longitudinally and circumferentially of the nut thread to wet and form a most intimate contact with the thread-defining surface of the nut and will flow into any depressions in that surface. The melted plastic is of relatively low viscosity as compared with plastics generally, but on cooling hardens into a coherent unitary body or plastic patch extending over the crests of a predetermined number of thread convolutions, as illustrated in FIGS. 1 through 3, before the melted plastic has had a chance to completely level off longitudinally of the nut thread.

Other plastics may be used in place of nylon 11 but it is desirable that such materials have a number of properties and characteristics comparable with or similar to nylon 11, in addition to elastic memory. Thus, at its melting point the material should have a viscosity of the order of that of nylon 11 and should preferably exhibit good wetting properties when in contact with metals. Other properties which need to be taken into consideration are relatively low moisture absorption, high resistance to abrasion, great resistance to common chemicals, high relative hardness, high strength, toughness and resiliency, and low coefficient of friction. Since for many uses, the plastic materials will be exposed to temperatures as high as 250° Fahrenheit, it is preferable that for general purpose uses the plastic be mechanically and chemically resistant to prolonged exposure at temperatures above 250° F.

Other considerations which enter into the selection of a plastic to be employed in accordance with the teaching of this invention are concerned, to a suitable extent, with properties facilitating manufacture of the patch-type fastener. In this connection, it is desirable that the plastic be available in fine powder form or capable of being reduced to fine powder form; that it be capable of adhering directly to the material of the nut with a firm bond and require no more than simple and inexpensive preparation of the metal thread surfaces to obtain such a firm bond. It is also desirable that the material have a melting point or flow point which is well below the temperature at which it begins to degrade or decompose so that complex or expensive heating controls may not be required.

By way of example and illustration, other linear polyamide resins such as nylon 6, nylon 6/6, nylon 6/10 and nylon 8 have properties as outlined above which are fairly comparable with those of nylon 11. Certain of the vinyl resins, including particularly vinyl chloride-vinyl acetate copolymers, also possess the above described properties to an adequate degree and can be used where exposure to organic solvents is not likely. FEP fluorocarbon, a copolymer of tetra-fluoroethylene and hexafluoro-propylene, possesses the above described properties comparable, and in some instances superior, to nylon 11 and may also be used for general purpose uses. Polypropylene resins possess many of the above described properties, and in comparable degree to nylon 11, and may be used where exposure to organic solvents at temperatures above 176° F. is not likely to be encountered.

Turning now to FIG. 19, an apparatus constructed in accordance with the teachings of the invention, and shown only diagrammatically in FIGS. 4 and 5, is illustrated at 100 in an overall elevational view. Apparatus 100 is provided with a frame 102 with which are associated the various means at the various stations previously shown only diagrammatically. Nuts 30 of standard manufacture are supplied from a first hopper 104 to a chute 106, hopper 104 being of the type which rotates so as to tumble the supply of nuts and orient nuts with their end faces aligned with the guide walls 108 and 110 of the chute so that the nuts 30 will slide down the chute, as best seen in FIG. 20. As the nuts slide down the chute, those which are of an axial length greater than the distance between guide wall 108 and a bar 112 come to rest upon the upper edge of the bar 112 which is placed at the bottom of the chute 106 in order to catch nuts of an axial length greater than that which should be permitted to pass through the apparatus so that such nuts may be removed at 113. As best seen in FIGS. 19 and 21, those nuts which pass beyond bar 112 progress toward the nut feeding means of the apparatus by falling into an accumulator chamber 114 of a second hopper 116, the front wall 118 of which is shown to be transparent for purposes of illustration. A dial plate 120 is mounted for rotation about a horizontal axis of rotation below the accumulator chamber 114 in such position that the periphery 122 of the dial plate 120 passes into communication with the accumulator chamber at point 124 and passes out of communication with the accumulator chamber at point 126. The dial plate is provided with slots 128 formed within the perimeter thereof, the slots 128 being complementary in size and configuration with the nuts which are accumulated within the accumulator chamber. As the dial plate rotates, the slots 128 are exposed to the nuts within the accumulator chamber between points 124 and 126 so that one nut will fall into each slot. In order to assure that every slot is filled with a nut, an agitator wheel 130 is mounted for rotation above and to the left of the axis of rotation of the dial plate and in such position as to communicate with the accumulator chamber between points 126 and 132. The agitator wheel 130 is rotated in the same direction as the direction of rotation of the dial plate and is provided with serrations or protrusions 134 along the perimeter thereof. These protrusions 134 engage the nuts within the accumulator chamber and agitate the nuts so that the accumulated nuts will assume a general pattern as illustrated in FIG. 21. Since the protrusions travel in a direction opposite to the direction of travel of the periphery of the dial plate at point 126, the agitation accomplished by the agitator wheel 130 serves to preclude jamming-up of the nuts at point 126, a condition which might otherwise occur as a result of the direction of rotation of the dial plate, as well as to attain overall agitation to assure that every slot 128 is filled with a nut. The resilient nature of the agitator wheel serves to assure that neither the nuts nor the dial plate will be mutilated by the tendency for the nuts to accumulate in the vicinity of point 126.

The nuts within the slots in the dial plate are then carried beyond point 126 by the dial plate and are retained within the dial plate by a shroud guide assembly 136 along which the nuts travel. Thus, the nuts which are now in fixed intervals in the dial plate are fed to a transfer station 138 where the nuts are transferred from the dial plate to a horizontally extending guide track 140 by virtue of each nut having an axial length greater than the thickness of the dial plate and projecting beyond the dial plate in a direction perpendicular to the paper so as to be engaged by an inclined surface 142 at the end of guide bar 144, which forms the upper portion of guide track 140, to thus be drawn from its respective slot as the dial plate rotates past the guide track 140. At the same time, a drive chain 146 having links 148 provided with projections 150 spaced apart to receive the nuts therebetween is brought into engagement with each nut, as best seen in FIG. 21, so that the nuts are driven along the guide track 140 at a predetermined speed toward the next station. At the next station, each nut 30 is transferred to a pin 32, the pins 32 being fixed to an endless belt 34 which is driven along a path which is juxtaposed with the path of the drive chain 146 as the drive chain advances the nuts along the guide track, all as seen in FIG. 22. The belt 34 is shown in greater detail in FIGS. 23 through 25 wherein each pin 32 is shown fixed to a respective base plate 152 and each base plate 152 is shown mounted upon the belt 34 by means of mounting screws 154 passing through the belt and through the base plates to engage securing nuts 156. The configuration of pins 32 has already been described in detail. The pins are preferably fabricated of a fluoroplastic such as that known as Teflon, and the base plates are preferably constructed of a phenolic resin or other high pressure laminates such as that known as Micarta. The belt is preferably fabricated of a rubberized, fiber-glass reinforced material. The materials selected for the belt, the pin, and the base plates are preferably chosen from among those materials which will not respond to induction heating and which will afford adequate strength. Since the pins will later come into contact with molten plastic, the material from which the pins are fabricated should provide non-sticking or non-adhering characteristics so that the molten plastic will not adhere to the pins, but only to the desired surface of the nuts carried by the pins. The rear face 158 of the belt 34 is provided with spaced laterally extending grooves 160 which enable the belt to be driven in timed sequence with the drive chain 146 to assure that each pin 32 is properly aligned with each nut at the station where the nuts are transferred from the guide track 140 to the pins.

Turning now to FIGS. 26 and 27, the belt 34 is driven in such timed relation by a ribbed drive wheel 162 which is driven through a drive shaft 164 by a gear train 166 which is synchronized with the drive of the drive chain 146. As each pin 32 is brought by the belt 34 into the path of the nuts being driven along the guide track 140 by the drive chain 146, each pin will enter the aperture of a nut so that the nuts may now be carried along by the pins to the next station. Since it is desirable to have a certain amount of clearance between the arbor portion 42 of each pin and the aperture of each nut, the nuts are generally held relatively loosely as they are picked up from the guide track and carried along by the pins toward the next station. Where a large volume of nuts is processed continuously in the apparatus, it is possible that the configuration of some nuts entering the apparatus may vary somewhat from the desired configuration. It has already been explained that nuts of excessive length are caught by the bar 112 at the bottom of the first hopper 104. However, some nuts may depart from the norm by having undersized apertures, or apertures which are not centered, or no apertures at all. When such a nut is presented to a pin by the drive chain 146, the pin will be unable to enter the nut and precautions must be taken to accommodate that situation. Thus, belt 34 is made to pass across a sensing roll 170 which is mounted for transverse motion upon a bellcrank 172 and is resiliently biased by a rod and spring assembly 174 against the belt (also see FIG. 22). An electrical switch (not shown) is responsive to the transverse movement of the sensing roll and the consequent rocking of the bellcrank to actuate control means for stopping the apparatus. When a pin encounters a nut which cannot be penetrated, the belt will be displaced from its normal path of travel thereby displacing the sensing roll and actuating control means for stopping the apparatus until the condition is corrected.

As seen in FIGS. 28 and 29, the pins with the nuts thereon are then brought past the electrostatic discharge means 66 shown in the form of a high voltage device 176 which ionizes the air in the vicinity of the pins and the nuts to neutralize any static electric charge which may be present upon the pins or upon the nuts. Any such electrostatic charge should be dissipated in order to permit consistent flow of the plastic powder which is to be placed into the cavity 70 formed between the pin and the thread-defining surface of each nut. As also seen in FIGS. 28 and 29, the pins are also brought past the nut alignment means 64 which is in the form of a flat plate 178 juxtaposed with the path of the nuts 30 so that nuts which do not have a downwardly facing wrench face 62 will be engaged by the flat plate 178 and rotated so as to orient each nut upon each pin with a wrench face 62 of the nut lying in a horizontal plane and thus facing downwardly. While the nuts 30 are so oriented when they are in the guide track 140, the orientation may change as the nuts leave the guide track and the nut alignment means 64 is provided to compensate for any such change. Beyond nut alignment means 64 in the path of travel of the nuts and pins, is a nut seating means 68 which is best illustrated in FIGS. 30 and 31. As seen in FIG. 30, the nuts 30 are still loosely held upon the arbor portions 42 of the pins 32 as the pins approach the nut seating means 68. The purpose of the nut seating means is to push each nut onto each pin until the nut is seated against the shoulder 180 which lies between the arbor portion 42 and the shank portion 40 of each pin 32. In this manner, each nut is properly located upon each arbor portion so that the sealing shoulder 44 and the undercut 46 are properly located with respect to the thread-defining surface for further operations. The belt 34, as it passes through the nut seating means, is carried in a track 182 which supports the belt 34 and guides the belt and the pins 32 along the prescribed path through the apparatus 100, the track being secured to the frame 102 of the apparatus 100. The nut seating means 68 is provided with a frame 184 secured to the track 182 by means of a bracket 186 upon which the frame 184 is mounted by means of adjusting screws 188 passing through elongated slots 190. A rod 192 passes through the frame 184 and carries a yoke 194 at one end thereof and a roller 196 is rotatably mounted in the yoke 194. The roller 196 is biased into the path of the nuts by virtue of a helical spring 198 which tends to force the yoke 194 away from the top of the frame 184 and toward the path of the nuts. At its other end the rod 192 is threaded and receives a complementary threaded wheel 200 which may be rotated to accurately locate the surface of the roller with respect to the path of the nuts upon the pins. Thus, as the belt 34 carries the pins 32 with the nuts thereon beneath the roller 196, the roller will engage each nut and push that nut along its respective pin until the nut is properly seated upon the pin, the roller being raised slightly against the bias of the spring 198 as each nut passes below the roller. The entire frame 184 may be displaced relative to the track 182 by loosening adjusting screws 188 to accommodate nuts of different sizes.

After the nuts 30 are properly seated upon their respective pins 32, the belt 34 continues to carry the pins and nuts along the track 182 to which the belt is confined by a guide roller 202 (see FIG. 4) and each nut is brought to the next station where distributor means 75, shown in the form of a powder distributor 210, places the desired amount of plastic powder 76 into the caviety 70 formed by the cooperation of each arbor portion 42 and the thread-defining surface of each nut 30. The plastic powder distributor 210 is shown in detail in FIGS. 32 and 33 and it is seen to have a supply chamber 212 located above the path of the nuts for containing a supply 213 of plastic powder 76 and including a funnel-like hopper 214 leading to a throat 216 which is secured in a mounting plate 218 supported upon the frame 102 of the apparatus 100 by guide brackets 220 which engage a groove 222 in the periphery of the mounting plate 218. Immediately below the mounting plate 218 is a throttle plate 224 having an elongated slot 226 extending therethrough and at least partially communicating with the throat 216. A distributor plate 228 is mounted for rotation immediately below the throttle plate 224 by being fixed to the upper end of a vertically extending shaft 230 which is itself rotatably mounted within the frame 102 of the apparatus 100. The distributor plate 228 carries a series of spouts 232 located upon a circle having its center aligned with the axis of rotation of the distributor plate and having a radius equal to the radial distance between the elongated slot 226 in the throttle plate and the center of the throttle plate which is coaxial with the axis of rotation of the distributor plate. Thus, it will be seen that as the distributor plate rotates, the passage 234 in each spout will provide a conduit which will come into communication with the powder supply 213 through alignment with the elongated slot 226 in the throttle plate and, as long as the passage 234 in the spout 232 is in such communication, powder will be fed by the force of gravity from the supply to the spout. The lower ends 236 of the spouts 232 travel a circular path which is juxtaposed with the path of the nuts carried by the pins, and the rotation of the distributor plate is so synchronized with the movement of the belt which carries the pins that each spout is brought into close proximity with each nut as the nuts travel past the distributor. The combination of the downward pull of gravity and the angular velocity of the spouts assures that powder is directed into each cavity 70 between the arbor portion 42 of a pin and portion 72 of the thread-defining surface of a nut through the opening 74 to the cavity. It is noted that the relative speed between the powder entering the cavity and the thread-defining surface of the nut in the direction of travel of the nuts should be maintained at a minimum to assure that the powder is distributed evenly throughout the entire cavity. It has been found advantageous to adjust the speed of rotation of the distributor plate so that there is some relative movement between the spout and the nut as the spout comes into proximity with the nut so that the spout will sweep across the opening to the cavity and even distribution of powder within the cavity will be assured. Thus, by allowing the spout to travel only slightly faster or slightly slower than the travel of the nut, the movement of the nut and the spout as the spout travels on its arc toward, across and away from the nut traveling in a straight line may be so synchronized as to achieve a sweeping of the spout across the face of the nut and across the opening to the cavity. However, the relative speed between the spout and nut attained by such a measure should be maintained at a minimum so as not to disturb the distribution of the powder in the deposit. In order to control the amount of powder discharged through each spout, the mounting plate 218 is itself mounted for rotation within the guide brackets 220 relative to the throttle plate 224 about an axis of rotation coincident with the axis of rotation of the distributor plate 228. Such rotation of the mounting plate will move the throat 216 relative to the elongated slot 226 in the throttle plate to selectively expose a greater or lesser length of the elongated slot to the supply 213 of powder 87 so that each spout will be in direct communication with the supply of powder for a greater or lesser length of time during its travel in communication with the elongated slot and the amount of powder passing from the supply to the spout will be metered accordingly so that only a selectively measured amount will pass through the passage in the spout. The mounting plate is secured in any desired angular position by means of an arm 238 which is fixed to the mounting plate and has a threaded stud 40 passing through a slot 242 in a brace 244 mounted upon one of the guide brackets 220. A nut 246 is threaded onto the stud 240 so that the arm 238 can be clamped against the brace 244 at any desired angular location. Thus, the quantity of powder dispensed by the distributor 210 may be varied to accommodate various sizes of nuts in the apparatus 100. To ensure that each nut will receive an adequate supply of powder, the volume released by the spout is preferably adjusted to be greater than that which is required for the establishment of a patch so that an excess amount of powder will be dispensed. Variations in the dimensions of the pins and nuts, variations in the location of a pin and nut passing under the spout and the impracticality of consistently depositing the precise amount of powder required for each patch are all factors which lead to the desirability of dispensing an excess amount of powder.

Since the apparatus is advantageously adapted to accommodate nuts of a variety of sizes and types, the speed at which the belt travels may be changed. Such a change in belt speed requires a change in the speed of rotation of the distributor plate 228, which in turn, may require a change in the angular position of the elongated slot 226 in the throttle plate 224 so that powder is discharged into each spout 232 either earlier or later in order to accommodate faster or slower speeds, respectively. Since the speed at which powder may drop through the elongated slot in the throttle plate is practically constant and since the speed of rotation of the distributor plate is varied to match the speed of travel of the belt and the nuts carried thereby, it will be apparent that the leading edge 250 of the elongated slot 226 passing through the throttle plate must be displaced along the path of travel of the spout in a direction opposite to the direction of travel of the spout 232 (toward the left in FIG. 32) so that powder from the supply may begin its travel to the inlet of the spout at an earlier point in time in order that such powder may reach the bottom, or outlet, of the spout when the bottom of the spout is juxtaposed with a corresponding nut. In order to accomplish such an adjustment, the throttle plate 224 is also mounted for rotation about a central axis aligned with the axis of rotation of the mounting plate 218 and the distributor plate 228. The angular location of the leading edge 250 of the elongated slot 226 is fixed by fixing the location of an arm 252 which is secured to the throttle plate 224. The location of the arm 252 is fixed by manually adjusting the position of a rod 254 with respect to the first end of a link 256 which is ordinarily in a fixed position during the operation of the apparatus 100. As best seen in FIG. 22, the other end of the link 256 is connected to an actuating means 258 which is responsive to the drive mechanism of the apparatus so that when the apparatus is stopped, either intentionally or accidentally, the link 256 is shifted to the left, as seen in FIGS. 22 and 32, and the throttle plate 224 is rotated so that the elongated slot 226 is located beyond the throat 216 and is no longer in communication with the powder supply 213 so that the flow of powder through the spouts 232 is stopped. In order to assure that the passage 234 of each spout 232 is free of any powder which might otherwise cling to the walls of the spout and clog the passage as the spout is brought into communication with the elongated slot in the throttle plate, the throttle plate 224 is provided with a second slot 260 diametrically opposed to the elongated slot and displaced radially from the center of the throttle plate a distance equal to the radial displacement of the inlets of the spouts so that each spout 232 will communicate wtih the second slot 260. The second slot, in turn, communicates with a radial passage 262 leading to an inlet passage 264 passing through the mounting plate 218 and a hose fitting 266 located therein. A source of compressed air (not shown) is connected to the hose fitting 266 so that as each spout comes into communication with the second slot 260, air is discharged through the passage 234 in the spout and any powder which may otherwise cling to the walls of the spout is blown from the spout to establish a clear passage. All excess powder and any powder blown from the spout by the compressed air is preferably collected by a vacuum system (not shown).

As seen in FIG. 32, as the pins are carried beyond the point where powder is placed within the cavity, the shank portion of each pin is brought into contact with a cantilever member 270 which is mounted on a rod 272 fixed to the track 182 through a mounting block 274 and which projects into the path of the pins. The cantilever member 270 is resiliently urged into the path of the pins so as to be engaged by the shank portion of a particular pin and urged in a direction out of the path of travel of the pins against the resilient biasing force by the travel of the particular pin engaging the cantilever member. When that particular pin has traveled beyond the end of the cantilever member, the resilient biasing force will snap the cantilever member back into the path of the pins until the cantilever member strikes the shank portion of a subsequent pin. The shock resulting from the force with which the cantilever member strikes the shank portion of the subsequent pin will tend to settle the deposit of powder within the cavity 70 so that any slight inequalities in the distribution of the powder within the deposit will tend to be smoothed out prior to carrying the pins to the next subsequent station.

At the next station, the pins are still maintained at an angle to the horizontal by virtue of the angle of the track 182, and the nuts carried on the pins are presented to excess powder removal means 77 shown in the form of blower means 280, best illustrated in FIGS. 34 through 36. The blower means 280 includes a hollow air tube 282 mounted in a bracket 284 carried by the frame 102 of the apparatus 100. The air tube 282 is connected at one end 286 to a source of compressed air (not shown) and carries at the other end thereof a nozzle 288 having what may be described as a fish-tail configuration for establishing an elongated opening 290 through which the air introduced into the tube 282 may flow. The elongated opening 290 of the nozzle 288 is juxtaposed with the path of travel of the nuts carried by the pins such that the flow of air is directed at the opening 74 to the cavity 70 (also see FIGS. 14 and 15). The pressure of the air introduced into the tube 282 is carefully regulated so that only a relatively mild jet of air is directed against the initial convolutions 80 of the thread-defining surface so that the powder deposited thereon is blown clear of the nut to establish a lead-in thread free of any deposit of plastic powder. Thus, it will be seen that by depositing an excess amount of powder through the use of the distributor means 75 and then removing the unwanted excess through the use of the blower means 280 the precise amount of powder is established in a deposit on the thread-defining surface, which precise amount is that amount required for the subsequent establishment of the desired plastic patch.

In order to remove any residual particles of powder which may cling to the end face of each nut 30, the nuts are subsequently carried to a station where the rotating brush 90 comes into contact with the end face of each nut as best seen in FIG. 37. Such brushing tends to clean the end of the pin as well as the end face of the nut so that the only powder remaining on the nut is within the deposit which will become the plastic patch. As described above, in connection with FIG. 17, where the nuts are of greater axial length, it may be necessary to employ an auxiliary blowing means 95, such as that depicted in FIG. 17, and located subsequent to the brush 90 as seen in FIG. 4 to eliminate any further unwanted particles of powder from the thread-defining surface of the nut.

The nuts are then transported through the field of a high frequency induction heating coil 300, as best seen in FIGS. 38 and 39 as well as in FIGS. 4 and 18. The high frequency induction heating coil 300 will heat the outer surfaces of each nut body and the heat so generated will be conducted through the body of the nut to the thread-defining surface and the deposit of powder thereon to fuse the powder into an integral plastic patch and adhere the patch to the thread-defining surface. The desirability of heating the nut and the powder deposit therein from the external surfaces of the nut body has already been pointed out above. Because there is a maximum temperature to which the outer surfaces of each nut can be exposed before the body of the nut is damaged by overheating, the heating coil 300 must have a predetermined minimum length so that adequate heat can be generated at the surfaces of the nut body without raising the temperature of those surfaces to an undesirable level. For example, where the apparatus has been made to operate upon nuts of standard manufacture such as unplated three-eighth inch nuts, it has been found that the external surface temperature should be brought to approximately 475° F. and where the nuts are traveling at a rate of about 1.75 feet per second through the apparatus a coil length of approximately 20 inches has been found satisfactory. The uniform orientation of the nuts upon the pins achieved by the nut alignment means 64 assures uniformity in the heating of each deposit of powder in each nut and precludes overheating or underheating.

Referring back to FIGS. 4 and 5, it will be seen that the nuts are made to travel along a path of relatively great length after leaving the heating means 97 and prior to being stripped from the pins by the stripper means 98. The initial portion of the length of travel allows the heat generated at the external surfaces of the nut bodies to penetrate the bodies and heat the powder deposit to fuse the powder and adhere the fused powder to the thread-defining surface. Shortly after leaving the heating means 97, the belt 34 leaves the track 182 and is returned to a generally vertical orientation as seen at station 310 so that pins 32 once again project generally horizontally. Thus, as the powder fuses, there will be no tendency for the fused plastic to flow into a non-symmetrical pattern as might otherwise occur if the pins were still tilted at an angle to the horizontal. Continued travel of the pins brings the pins around the end roll 312 and toward the stripping station. The belt 34 is brought around the end roll 312 in such a manner that the pins project radially inwardly from the belt toward the center of the roll so that any centrifugal forces acting upon the nuts carried by the pins will tend to retain the nuts seated upon the pins rather than establishing forces which would tend to pull the nuts from the pins. Continued travel of the nuts allows the nuts to be cooled by the natural convection of the ambient air. Such cooling may be enhanced by blowing cool air into the path of the nuts through means such as the perforated air pipe 314 shown diagrammatically in FIG. 5. In some instances, more intensive cooling is required. For example, where plated nuts are processed by the apparatus, temperatures may be higher and there is a tendency for heat to be retained within the nut body. In these instances a water trough 316, as illustrated diagrammatically in FIG. 4, may be located beneath the path of travel of the pins and the nuts thereon and cooling water 318 may be circulated through the trough 316 to contact the surface of each nut, as seen in FIG. 40, and carry away excess heat.

After the plastic patch has been formed within each nut and the nuts are cooled, the nuts are stripped from the pins at the stripping station by the stripper means 98 illustrated more specifically in the form of stripping mechanism 320 in FIGS. 41 through 43. A pair of blades 322 are spaced vertically and located with respect to the path travelled by the belt and the pins thereon such that the shank portions of the pins will enter the space between the blades and, as each pin continues its travel, the path of the pins is made to diverge from the direction in which the blades extend so that the nuts, which have a larger diameter than the pins and the spacing between the blades, will be engaged by the blades and will be pulled from the pins as the pins move transversely in relation to the blades, all as seen in FIG. 41. The nuts then fall freely from the apparatus and are collected for subsequent processing or use. The blades 322 of the stripping mechanism 320 are fixed to arms 324 which are mounted upon a bracket 326 connected to the frame 102 of the apparatus 100. In order to accommodate pins and nuts of varying diameters, the arms 324 may be moved relative to one another to increase or decrease the spacing between the blades. Thus, the arms 324 are fixed to shafts 328 which are rotatably mounted in the bracket 326 and which carry gears 330 at either end thereof. The gears 330 at each end of the shafts 328 are meshed so that movement of either arm 324 will move the other arm an equal amount and the spacing between the blades will be increased or decreased without changing the relationship between the blades and the line along which the pins travel. Movement of the arms is accomplished by rotation of adjusting knobs 332 which are fixed to adjusting shafts 334 journaled in blocks 336 fixed to one arm and threadably engaging followers 338 fixed to the other arm. The blocks and followers are resiliently urged away from one another by helical springs 340 extending therebetween. Guide plates 342 are fixed to each blade 322 on either side of the space between the blades and serve to engage the belt and establish the divergent path followed by the belt as the nuts are drawn from the pins.

After the nuts are stripped from the pins, the pins are cleaned so that no residual plastic remains on the pins when the pins are once again brought to the guide track 140 to receive fresh nuts 30. As seen diagrammatically in FIG. 4 and in more detail in FIGS. 44 and 45, the pins are passed through several pairs of brushes 350 which are mounted in a bracket 352 fixed to the frame 102 of the apparatus 100. In addition, air may be supplied through a distributor pipe 354 having apertures 356 located along the path of the pins and including a hose fitting 358 for connection to a source of air (not shown), the purpose of the air being to blow any residual particles from the pins as well as cool the pins before fresh nuts are placed upon the pins.

It can be seen that the apparatus 100 may be operated continuously in order to carry out the method of the invention and produce self-locking internally threaded fasteners in large quantities at relatively low cost.

It is to be understood that the above detailed description of embodiments of the invention is provided by way of example only and is not intended to restrict the invention. Various details of design, construction, and procedure may be modified without departing from the true spirit and scope of the invention as set forth in the appended claims.

The embodiments of the invention in which an exclusive property or privilege is claimed are defined as follows:

1. A continuous process for making self-locking internally threaded fasteners having a threaded bore open at both ends and in which the self-locking characteristics of each fastener is derived from a free-form plastic patch of limited axial and circumferential extent adhered to the thread-defining surface of the fastener, said continuous process comprising establishing and maintaining a supply of plastic powder at a powder applying station, sealing one end of the thread-defining surface of each fastener by inserting a sealing element into said bore of each fastener from one end thereof effectively to seal a portion of said thread-defining surface adjacent said one end of said bore from plastic powder and to limit such plastic powder both axially and circumferentially when placed in said bore, continuously transporting the fasteners having one end thereof sealed past the powder applying station, projecting plastic powder from the supply thereof from a location remote from said sealed end toward the sealed end and onto a further portion of the thread-defining surface intermediate the ends thereof for each fastener transported past the powder applying station, and continuously passing the fasteners past a heating station to fuse the powder when applied to each of the fasteners to establish a patch adhered to the thread-defining surface of each of the fasteners, at least those portions of the sealing element which so limit the plastic powder being constructed of a material having non-adhering characteristics so that the fused powder will not adhere thereto.

2. The method of claim 1 wherein an excess amount of powder is deposited upon the thread-defining surface of the fastener and subsequently removing unwanted powder from the end of the excess deposit adjacent the other end of the thread-defining surface to establish a longitudinal boundary displaced axially from said other end.

3. The method of Claim 2 wherein the excess powder is removed by blowing the excess from the remainder of the deposit.

4. The method of Claim 1 wherein said heating is accomplished by heating the external surface of the fastener such that the heat will penetrate the body of the fastener to fuse the powder and establish the patch.

5. The method of Claim 4 wherein said heating includes initially heating the fastener only enough so that the heat transferred to the powder is sufficient to join the particles of the powder to one another by fusion of the powder and adhere the joined particles to the thread-defining surface by such fusion, cooling the fastener and the powder, and subsequently further heating the fastener body with the adhered powder such that said powder is sufficiently fused for a length of time necessary to minimize voids therein resulting from fusion during the initial heating and to establish said free-form patch.

6. A method of making a self-locking internally threaded fastener in which the self-locking characteristic is derived from a free-form plastic patch of limited circumferential extent adhered to the thread-defining surface of the fastener, said method comprising:
seating the fastener upon a pin having a cavity-forming portion such that the pin is received within the fastener with said portion of the pin and a portion of the thread-defining surface of the fastener establishing a cavity;
subsequently placing a deposit of plastic powder upon said portion of the thread-defining surface within the cavity; and
heating the fastener to fuse the powder deposit and establish a patch adhered to the thread-defining surface.

7. The method of claim 6 wherein the powder is deposited such that the longitudinal boundaries of the deposit are displaced axially from the corresponding ends of the thread-defining surface.

8. The method of claim 7 wherein said deposit of plastic powder is established by depositing an excess amount of powder within the cavity and upon the thread-defining surface of the fastener and subsequently removing unwanted powder from at least one end of the excess deposit to establish a longitudinal boundary displaced axially from the corresponding end of said surface.

9. The method of claim 8 wherein the excess powder is removed by blowing the excess from the remainder of the deposit.

10. The method of claim 6 wherein said heating is accomplished by heating the external surface of the fastener such that the heat will penetrate the body of the fastener to fuse the powder deposit and establish the patch.

11. The method of claim 10 wherein said heating includes initially heating the fastener only enough so that the heat transferred to the powder deposit is sufficient to join the particles of the powder to one another by fusion of the powder and adhere the joined particles to the thread-defining surface by such fusion, cooling the fastener and the deposit, and subsequently further heating the fastener body with the adhered deposit such that said deposit is sufficiently fused for a length of time necessary to minimize voids therein resulting from fusion during the initial heating and to establish said free-form patch.

12. The method of Claim 6 wherein the cavity is provided with an opening adjacent one end of the pin and the fastener seated thereon and wherein the pin with the fastener thereon is advanced in a given direction of travel along a predetermined path at a given speed and plastic powder is made to travel at a predetermined speed in the same direction of travel and coextensive with at least a portion of said path to enter the cavity through said opening with a minimum relative speed between the powder and the fastener, in said direction of travel.

13. The method of Claim 12 wherein the longitudinal axis of the pin extends transverse to said direction of travel and the longitudinal axis of the fastener is aligned with the longitudinal axis of the pin, the aligned axes being inclined at an angle to the horizontal during travel along at least the portion of the path where the plastic powder enters the cavity so that the powder will be distributed over the exposed length of the thread-defining surface by dropping through the opening and into the cavity.

14. A method of making a self-locking internally threaded fastener in which the self-locking characteristic is derived from a free-form plastic patch of limited axial and circumferential extent adhered to an internal thread-defining surface in an aperture of a fastener, said method comprising:
seating the fastener on a pin entering one end of said aperture;
thereafter, with said fastener seated on said pin, depositing plastic material in powder form through the other end of the aperture and onto a limited axial and circumferential area of said thread-defining surface, said limited area being axially spaced from at least one end of said thread-defining surface;
thereafter, with said fastener seated on said pin, heating the fastener to a temperature sufficient to melt the plastic powder;
thereafter, cooling said fastener and said plastic material to solidify the latter, whereby to provide a plastic patch of limited axial and circumferential extent adhered to the limited area of the thread of the fastener.

15. The method of claim 14 wherein said pin holds said fastener with its axis inclined at a predetermined angle to the horizontal during the depositing step.

16. The method of claim 15 wherein said angle is between a lower limit of about 30° and an upper limit of about 50°.

17. The method of claim 14 wherein, during said heating step, said pin holds said fastener with its axis generally horizontal and said limited area facing upwardly.

18. The method of claim 14 wherein said cooling is accomplished while the fastener is seated on the pin and thereafter removing the fastener from the pin.

19. Apparatus for continuously producing self-locking internally threaded fasteners in which the self-locking characteristic of each fastener is derived from a free-form plastic patch of limited axial and circumferential extent adhered to the thread-defining surface of the fastener, said apparatus comprising means for sealing a portion of said thread-defining surface adjacent to one end thereof for each fastener presented to said sealing means, means for projecting a plastic powder from a location remote from said sealed end toward the sealed end and onto a further portion of said thread-defining surface intermediate the ends thereof for each fastener presented to said projecting means, means for heating the fastener and the plastic powder when applied thereon to establish a patch adhered to the thread-defining surface of said fastener for each fastener presented to said heating means, means for continuously and successively presenting a plurality of internally threaded fasteners to said sealing means and means for transporting the plurality of the then-sealed fasteners past said projecting means and said heating means.

20. The apparatus of claim 19 wherein said means for projecting the plastic powder onto the thread-defining surface deposits an excess amount of powder upon the thread-defining surface of the fastener and said apparatus includes means for subsequently removing unwanted powder from the end of the excess deposit adjacent the other end of the thread-defining surface to establish a longitudinal boundary displaced axially from said other end.

21. The apparatus of Claim 20 wherein the excess powder is removed by means included therein for blowing the excess from the remainder of the deposit.

22. The apparatus of Claim 19 wherein said heating is accomplished by means included therein for heating the external surface of the fastener such that the heat will penetrate the body of the fastener to fuse the powder and establish the patch.

23. Apparatus for making self-locking internally threaded fasteners in which the self-locking characteristic is derived from a free-form plastic patch adhered to the thread-defining surface of the fastener, said apparatus comprising:
a frame;
an endless carrier means mounted for continuous movement with respect to the frame;
a plurality of like pins mounted for movement with the carrier means;
feed means associated with the frame for feeding internally threaded fasteners in synchronism with the movement of the carrier means and placing a fastener upon each pin as the pins move with the carrier means;
distributor means associated with the frame for placing a deposit of plastic powder upon a portion of the thread-defining surface of each fastener placed upon each pin as the pin is carried past the distributor means;
heating means associated with the frame for heating each fastener upon each pin as the fasteners and pins travel past the heating means to fuse the powder deposit and establish a patch adhered to the thread-defining surface; and
stripper means for removing each fastener from each pin after the patch has been established and adhered to the fastener.

24. The apparatus of claim 23 wherein the pins each have a cavity-forming portion such that the pins are received within the fasteners with each cavity-forming portion and a portion of the thread-defining surface of each fastener-establishing a cavity for receiving the deposit of plastic powder and confining the deposit to a limited circumferential extent.

25. The apparatus of claim 24 wherein each pin is provided with a shoulder defining the axial extent of said cavity for cooperatively engaging the thread-defining surface of a corresponding fastener and confining the deposit to a limited axial extent such that said patch will be axially displaced from at least one end of the thread-defining surface.

26. The apparatus of claim 25 wherein said distributor means deposits an excess amount of plastic powder in said cavity and including removal means associated with said frame for removing said excess to limit the axial extent of the deposit such that said patch will be axially displaced from the other end of the thread-defining surface.

27. The apparatus of claim 26 wherein the removal means includes blower means for blowing the excess powder from the amount deposited by the distributor means.

28. The apparatus of claim 23 wherein the feed means includes:
a dial plate mounted for rotation about a horizontal axis and including slots spaced about the periphery thereof for receiving the fasteners;
a hopper for conducting fasteners to the periphery of the dial plate with the longitudinal axes of the fasteners aligned parallel to the axis of rotation of the dial plate; and
means for agitating the fasteners in the hopper to facilitate the entry of a fastener into each slot as the dial plate rotates and the periphery thereof is exposed to the fasteners in the hopper.

29. The apparatus of claim 28 wherein said means for agitating the fasteners includes a resilient wheel mounted for rotation in the same direction as the dial plate about an axis of rotation parallel to the axis of rotation of the dial plate and displaced therefrom such that the periphery of the resilient wheel travels in an opposite direction to the periphery of the dial plate and passes adjacent thereto at the point where the periphery of the dial plate passes from the hopper to preclude jamming of the fasteners at that point while facilitating entry of fasteners into said slots by said agitation.

30. The apparatus of claim 29 wherein the resilient wheel is provided with fastener engaging protuberances about the periphery thereof.

31. The apparatus of claim 23 wherein the carrier means advances the pins with fasteners thereon in a given direction along a predetermined path at a given speed and the distributor includes means for advancing plastic powder at a given speed in the same direction of travel and coextensive with at least a portion of said path to place a deposit of powder upon the thread-defining surface of each fastener with a minimum relative speed between the powder and each fastener in said direction of travel.

32. The apparatus of claim 31 wherein the distributor includes a supply chamber for containing a supply of plastic powder and the means for advancing plastic powder includes at least one conduit having an inlet and an outlet, the conduit being movable with respect to the supply chamber such that the inlet will communicate with the supply chamber during a portion of such movement to allow a predetermined amount of powder to pass into the conduit and the outlet of the conduit will travel at a speed very nearly matching the speed of travel of the carrier means and the pins thereon such that powder leaving the outlet will travel at almost the same speed as the fasteners on the pins in said direction of travel.

33. The apparatus of claim 32 wherein the conduit is mounted for rotation relative to the supply chamber such that the outlet travels along a generally circular path, a portion of which circular path lies adjacent the path of travel of the fasteners carried by the pins of the carrier means.

34. The apparatus of claim 33 wherein said portion of the circular path lies vertically above the path of travel of the fasteners to allow the powder to drop into the fastener.

35. The apparatus of claim 34 wherein the longitudinal axis of each pin extends transverse to said direction of travel of the carrier means and each said axis is inclined at an angle to the horizontal during travel along at least the portion of the path where the plastic powder enters the fastener so that the powder will be distributed over the desired length of the thread-defining surface as the powder drops into the fastener.

36. The apparatus of claim 23 wherein the heating means includes means for heating the external surface of the fastener such that the heat will penetrate the body of the fastener to fuse the powder deposit and establish the patch.

37. The apparatus of claim 36 wherein the means for heating the external surface of the fastener comprises induction heating means placed along the path of travel of the carrier means.

38. The apparatus of claim 23 wherein the distributor means places a deposit of powder upon a portion of the thread-defining surface in excess of the amount of powder required for establishing the patch and including means associated with the frame for subsequently removing the excess from at least one end of the deposit to establish a longitudinal boundary in the deposit displaced axially from the corresponding end of said surface.

39. The apparatus of claim 38 wherein said means for removing the excess includes blower means for blowing the excess from the remainder of the deposit.

40. Apparatus for making a self-locking internally threaded fastener in which the self-locking characteristic is derived from a free-form plastic patch of limited circumferential extent adhered to the thread-defining surface of the fastener, said apparatus comprising:
  a pin having a cavity-forming portion such that the pin may be received within the fastener with said portion of the pin and a portion of the thread-defining surface of the fastener establishing a cavity;
  means for seating the fastener upon the pin;
  said cavity including an opening adjacent one end of the pin and the corresponding end of the fastener when the fastener is seated upon the pin;
  means for advancing the pin with the fastener thereon in a given direction of travel along a predetermined path;
  means for subsequently placing a deposit of plastic powder upon said portion of the thread-defining surface within the cavity when the fastener is seated upon the pin;
  said means for placing a deposit of plastic powder upon said portion of the thread-defining surface within the cavity including means for conducting plastic powder to said cavity;
  said conducting means being located above said predetermined path such that plastic powder will be dropped from the conducting means to enter into the cavity; and
  means for heating the fastener to fuse the powder deposit and establish a patch adhered to the thread-defining surface.

41. The apparatus of claim 40 wherein the longitudinal axis of the pin extends transverse to said direction of travel and the longitudinal axis of the fastener is aligned with the longitudinal axis of the pin, the aligned axes being inclined at an angle to the horizontal during travel along at least the portion of the path where the plastic powder enters the cavity so that the powder will be distributed over the exposed length of the thread-defining surface by dropping through the opening and into the cavity.

42. The apparatus of claim 23 including means for moving the pins and the fasteners placed thereon along a predetermined pith of travel and said distributor means includes a conduit for conducting plastic powder to the fasteners, said conduit being located above the path of travel of the fasteners to allow the powder to drop from the conduit and enter into the fastener.

43. The apparatus of claim 42 wherein the longitudinal axis of each pin extends transverse to said direction of travel of the carrier means and each said axis is inclined at an angle to the horizontal during travel along at least the portion of the path where the plastic powder enters the fastener so that the powder will be distributed over the desired length of the thread-defining surface as the powder drops into the fastener.

44. Apparatus for making a self-locking internally threaded fastener in which the self-locking characteristic is derived from a free-form plastic patch of limited axial and circumferential extent adhered to the thread-defining surface of the fastener, said apparatus comprising:
  means for establishing a deposit of plastic powder upon the thread-defining surface of the fastener with the longitudinal boundaries of the deposit displaced axially from the ends of said surface, said means including means for depositing an excess amount of powder upon the thread-defining surface of the fastener and means for subsequently removing unwanted powder from at least one end of the excess deposit by blowing the excess from the remainder of the deposit to establish a longitudinal boundary displaced axially from the corresponding end of said surface; and
  means for heating the fastener to fuse the powder deposit and establish a patch adhered to the thread-defining surface.

45. Apparatus for making a self-locking internally threaded fastener in which the self-locking characteristic is derived from a free-form plastic patch of limited circumferential extent adhered to the thread-defining surface of the fastener, said apparatus comprising:
  a pin having a cavity-forming portion such that the pin may be received within the fastener with said portion of the pin and a portion of the thread-defining surface of the fastener establishing a cavity;
  means for seating the fastener upon the pin;
  means for subsequently placing a deposit of plastic powder upon said portion of the thread-defining surface within the cavity when the fastener is seated upon the pin such that the longitudinal boundaries of the deposit are displaced axially from the corresponding ends of the thread-defining surface, said means including means for depositing an excess amount of powder within the cavity and upon the thread-defining surface of the fastener and means for subsequently removing unwanted powder from at least one end of the excess deposit by blowing the excess from the remainder of the deposit to establish a longitudinal boundary displaced axially from the corresponding end of such surface; and
  means for heating the fastener to fuse the powder deposit and establish a patch adhered to the thread-defining surface.

46. The apparatus of claim 45 wherein said heating is accomplished by means included for heating the external surface of the fastener such that the heat will penetrate the body of the fastener to fuse the powder deposit and establish the patch.

47. Apparatus for making a self-locking internally threaded fastener in which the self-locking characteristic is derived from a free-form plastic patch of limited circumferential extent adhered to the thread-defining surface of the fastener, said apparatus comprising:
  a pin having integral sealing and cavity-forming portions such that the pin may be received within the fastener with said portions of the pin and a portion of the thread-defining surface of the fastener establishing a cavity spaced from one end of the thread-defining surface;
  means for seating the fastener upon the pin with the sealing portion effectively sealing a portion of the thread-defining surface adjacent said one end thereof;
  the cavity having an opening adjacent one end of the pin and the other end of the thread-defining surface;
  means for advancing the pin with the fastener thereon in a given direction of travel along a predetermined path at a given speed;
  means for subsequently projecting a deposit of plastic powder upon said portion of the thread-defining surface within the cavity from a location remote from the sealed portion of the thread-defining surface toward the sealed portion when the fastener is seated upon the pin, the plastic powder being projected such that the powder is made to travel at a predetermined speed in the same direction of travel and coextensive with at least a portion of said path to enter the cavity through said opening with a minimum relative speed between the powder and the fastener in said direction of travel; and
  means for heating the fastener to fuse the powder deposit and establish a patch adhered to the thread-defining surface;

at least said sealing and cavity-forming portions of the pin being constructed of a material having non-adhering characteristics so that the fused powder will not adhere thereto.

48. The apparatus of claim 47 wherein the longitudinal axis of the pin extends transverse to said direction of travel and the longitudinal axis of the fastener is aligned with the longitudinal axis of the pin, the aligned axes being inclined at an angle to the horizontal during travel along at least the portion of the path where the plastic powder enters the cavity so that the powder will be distributed over the exposed length of the thread-defining surface by dropping through the opening and into the cavity.

References Cited

UNITED STATES PATENTS

| | | | |
|---|---|---|---|
| 3,018,519 | 1/1962 | Morin | 264—269 |
| 3,294,139 | 12/1966 | Preziosi | 264—269 |
| 3,437,541 | 4/1969 | Cooper | 151—7 |

ROBERT F. WHITE, Primary Examiner

J. B. LOWE, Assistant Examiner

U.S. Cl. X.R.

264—297; 425—110